US 6,653,037 B2

(12) United States Patent
Sawada et al.

(10) Patent No.: US 6,653,037 B2
(45) Date of Patent: Nov. 25, 2003

(54) TONER FOR DEVELOPING LATENT ELECTROSTATIC IMAGES, AND IMAGE FORMING METHOD AND DEVICE

(75) Inventors: Toyoshi Sawada, Odawana (JP); Masanori Suzuki, Sunto-gun (JP); Kohki Katoh, Sunto-gun (JP); Yohichiroh Watanabe, Fuji (JP); Masahide Yamashita, Numazu (JP); Akihiro Kotsugai, Numazu (JP); Keiko Shiraishi, Susano (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/988,142

(22) Filed: Nov. 19, 2001

(65) Prior Publication Data

US 2002/0132177 A1 Sep. 19, 2002

(30) Foreign Application Priority Data

| Nov. 20, 2000 | (JP) | 2000-353013 |
|---|---|---|
| Nov. 24, 2000 | (JP) | 2000-357190 |
| Sep. 21, 2001 | (JP) | 2001-290125 |
| Sep. 25, 2001 | (JP) | 2001-290317 |

(51) Int. Cl.⁷ ............................................. G03G 9/083
(52) U.S. Cl. ..................... 430/106.2; 430/108.4; 430/109.4; 430/111.4; 430/111.41; 430/126
(58) Field of Search ..................... 430/106.2, 108.4, 430/109.4, 111.4, 111.41, 126

(56) References Cited

U.S. PATENT DOCUMENTS

| 2,297,691 A | 10/1942 | Carlson |
| 2,618,552 A | 11/1952 | Wise |
| 2,874,063 A | 2/1959 | Greig |
| 3,345,294 A | * 10/1967 | Cooper ..................... 252/62.1 |
| 3,666,363 A | 5/1972 | Tanaka et al. |
| 4,071,361 A | 1/1978 | Marushima |
| 4,124,735 A | * 11/1978 | O'Horo ..................... 428/406 |
| 4,908,290 A | 3/1990 | Watanabe et al. |
| 4,956,258 A | 9/1990 | Watanabe et al. |
| 5,168,028 A | 12/1992 | Nanya et al. |
| 5,215,845 A | * 6/1993 | Yusa et al. ............... 430/106.6 |
| 5,288,557 A | 2/1994 | Perlman et al. |
| 5,288,577 A | 2/1994 | Yamaguchi et al. |
| 5,368,972 A | 11/1994 | Yamashita et al. |
| 5,429,901 A | 7/1995 | Muto et al. |
| 5,655,199 A | 8/1997 | Yamashita et al. |
| 5,774,775 A | 6/1998 | Aoto et al. |
| 5,863,690 A | 1/1999 | Yamashita |
| 5,873,018 A | 2/1999 | Aoto et al. |
| 5,882,832 A | 3/1999 | Tosaka et al. |
| 5,912,100 A | 6/1999 | Aoki et al. |
| 6,004,715 A | 12/1999 | Suzuki et al. |
| 6,010,814 A | 1/2000 | Kotsugai et al. |
| 6,074,794 A | 6/2000 | Fushimi et al. |
| 6,074,795 A | 6/2000 | Watanabe et al. |
| 6,103,441 A | 8/2000 | Tomita et al. |
| 6,168,894 B1 | 1/2001 | Aoki et al. |
| 6,180,298 B1 | 1/2001 | Kuroda et al. |
| 6,183,926 B1 | 2/2001 | Kuroda et al. |
| 6,212,351 B1 | 4/2001 | Kawagoe et al. |
| 6,221,549 B1 | 4/2001 | Emoto et al. |
| 6,228,550 B1 | 5/2001 | Matsuda et al. |
| 6,258,502 B1 | 7/2001 | Nakamura et al. |
| 6,269,228 B1 | 7/2001 | Kayahara et al. |
| 6,303,257 B1 | 10/2001 | Hasegawa et al. |
| 6,303,258 B1 | 10/2001 | Katoh et al. |
| 6,360,068 B1 | 3/2002 | Kinoshita et al. |
| 6,363,229 B1 | 3/2002 | Shiraishi et al. |
| 6,395,443 B2 | 5/2002 | Kuroda et al. |
| 6,405,002 B2 | 6/2002 | Ogiyama et al. |
| 6,406,826 B1 | 6/2002 | Suzuki et al. |
| 6,432,589 B1 | 8/2002 | Uchinokura et al. |
| 6,445,900 B2 | 9/2002 | Fukao et al. |
| 6,449,453 B1 | 9/2002 | Motohashi |
| 6,505,014 B2 | 1/2003 | Aoki et al. |
| 6,505,024 B2 | 1/2003 | Kayahara et al. |

FOREIGN PATENT DOCUMENTS

| JP | 42-23910 | 11/1967 |
| JP | 43-24748 | 10/1968 |
| JP | 47-12635 | 6/1972 |
| JP | 50-10143 | 2/1975 |
| JP | 50-30537 | 3/1975 |
| JP | 58-116559 | 7/1983 |
| JP | 60-229065 | 11/1985 |
| JP | 2-877 | 1/1990 |
| JP | 2-22673 | 1/1990 |
| JP | 2-87158 | 3/1990 |
| JP | 2-207275 | 8/1990 |
| JP | 3-200158 | 9/1991 |
| JP | 5-31139 | 2/1993 |

* cited by examiner

*Primary Examiner*—John Goodrow
(74) *Attorney, Agent, or Firm*—Oblon, Spivak, McClelland, Maier & Neustadt, P.C.

(57) ABSTRACT

A toner for developing latent electrostatic images is provided which contains, in a binder resin, at least a coloring agent formed from a metal material. A saturation magnetization of the toner is 0.01 to 10 emu/g, and a true specific gravity thereof is 1.33 to 1.62 g/m³. Also provided are an electrostatic charge image developer containing the toner for developing latent electrostatic images, an image forming device, and an image forming method using the toner for developing latent electrostatic images.

39 Claims, 7 Drawing Sheets

TONER FOR DEVELOPING LATENT ELECTROSTATIC IMAGES, AND IMAGE FORMING METHOD AND DEVICE

BACKGROUND OF THE INVENTION

1. Field of the Invention

The present invention relates to a toner for developing latent electrostatic images, an electrostatic charge image developer for developing latent electrostatic images, a toner container, an image forming device, and an image forming method which are applied to electrophotographic methods, electrostatic recording methods, electrostatic printing methods, and the like.

2. Description of the Related Art

Conventionally, a large number of methods, such as those in U.S. Pat. No. 2,297,691, Japanese Patent Application Publication (JP-B) No. 42-23910 (U.S. Pat. No. 3,666,363), JP-B No. 43-24748 (U.S. Pat. No. 4,071,361), and the like have been disclosed as electrophotographic methods. Generally, a latent electrostatic image is formed on an image carrier such as a photosensitive body or the like by various means. Next, the obtained latent electrostatic image is developed by using a toner. Further, as needed, after the toner is transferred onto a transfer material such as paper or the like, the toner is fused by heating, application of pressure, evaporating the solvent, or the like. On the other hand, the toner which remains on the image carrier without being transferred is cleaned. In this way, copy images are repeatedly obtained.

There are various types of developing methods for making a latent electrostatic image visible by using toner. Such methods are broadly classified into dry developing methods and wet developing methods.

Dry developing methods are further classified into methods utilizing double-component electrostatic charge image developers formed from a toner and a carrier, and methods utilizing a single-component electrostatic charge image developer formed from toner alone. The single-component electrostatic charge image developers are classified into magnetic single-component electrostatic charge image developers which utilize magnetic materials, and non-magnetic single-component electrostatic charge image developers which do not utilize magnetic materials. Currently, developing methods utilizing double-component electrostatic charge image developers are mainly used, from the standpoints of superior high speed properties, stability, and the like.

In a method utilizing a double-component electrostatic charge image developer, by stirring and rubbing the toner and the carrier, the toner and the carrier are charged to respectively different polarities, and a latent electrostatic image having a polarity which is opposite that of the charged toner is made visible. In accordance with the types of the toners and carriers, a magnetic brush developing method using an iron powder carrier (disclosed in U.S. Pat. No. 2,874,063), a cascade method using a beads carrier (disclosed in U.S. Pat. No. 2,618,552), a fur brush method, and the like are known. Further, as a black toner which is applied to these various types of developing methods, a fine powder is used in which a coloring agent such as carbon black or the like is dispersed in a binder resin formed from a synthetic resin or a natural resin.

Hereinafter, a developing method using a double-component electrostatic charge image developer will be described.

When a large number of copies are continuously output by using a double-component electrostatic charge image developer, at first, clear, good image quality can be obtained. However, gradually, replenishment of toner to the electrostatic charge image developer is not in time and the image quality deteriorates, or the replenished toner and the carrier are mixed together in a state in which charging is insufficient. In this way, toner deposition of the background of images, toner scattering and the like easily occurs. Places arise on portions of the developing sleeve where the toner is thin, and the tendency toward image blurring, non-uniform image density and the like can be seen. Such problems are marked particularly when images of large image surface areas are continuously output. Further, these phenomena tend to arise easily particularly with toners in which carbon black is utilized in the coloring agent.

Carbon black, which is generally used as a coloring agent, is an electrically conductive substance and is a high dielectric. Thus, in cases in which carbon black is dispersed within or included in the toner, the electrical conductivity of the toner itself increases, and the resistance thereof decreases. Thus, toner deposition of the background of images, toner scattering and the like arise easily, causes the toner to easily receive effects, such as the injection of charges, the release of charges and the like, of an external electrical field. As a result, although the rise in the charging is good, the release of charges is rapid, and the chargeability deteriorates over time. The durability easily deteriorates, and the transferability tends to worsen.

Carbon black forms secondary cohered matter which are usually called agglomerates. The agglomerates must be dispersed uniformly to the primary particles. However, in actuality, dispersing to the primary particles is difficult. Usually, the agglomerates exist within the toner as primary cohered matter, which are called aggregates, or in a state similar thereto. Thus, the dispersability cannot be considered to be sufficient. It is thereby easy for the amount of charge to become non-uniform, and there is the tendency for toner deposition of the background of images and toner scattering to easily occur.

Methods have been proposed for carrying out an oxidation treatment on the surface of the carbon black to increase the resistivity of the carbon black.

Specifically, for example, JP-B No. 5-31139 discloses, as a surface oxidation treatment method, a method of oxidation treatment by potassium permanganate. However, in this method, metal ions tend to remain as counter ions of the carboxyl group on the surface of the carbon black, and the resistivity of the carbon black decreases. When used in a toner, sufficient effects relating to an improvement in durability in high humidity cannot be obtained.

Further, Japanese Patent Application Laid-Open (JP-A) No. 3-200158 discloses a surface oxidation treatment method by ozone. However, the object is the improvement of the dispersability of the carbon black by the mutual operation of the carboxyl group on the surface and polyester which is a binder resin for the toner. As for the degree of oxidation, the amount of carboxyl groups on the surface of the carbon black is less than $0.1 \times 10^{-3}$ mol/g, which is not very large. This is insufficient with respect to an improvement in the durability of the toner under high humidity.

On the other hand, among single-component electrostatic charge image developers, magnetic single-component electrostatic charge image developers which contain magnetic materials instead of carbon black are widely used. A magnetic single-component electrostatic charge image developer generally contains magnetic materials in an amount of 20 to 60% by weight, which is large. The saturation magnetization of the toner is around 10 to 50 emu/g which is large. The toner also has the characteristic that the true specific gravity is around 1.6 to 2.2 g/cm$^3$ which is large, in contrast with the true specific gravity of about 1.2 to 1.3 g/cm$^3$ of a toner using carbon black which does not contain magnetic materials. However, when such a toner is used as a toner for a double-component electrostatic charge image developer, the magnetic constraining force with respect to the carrier or the electrostatic charge image developer carrier or the like increases. Thus, the image density decreases, and it becomes difficult for the toner to separate from the surface of the carrier. As a result, there is a problem in that the toner easily fuses to the carrier surface, and so-called carrier spent easily occurs.

Accompanying the sudden popularization in recent years of OA machines such as copiers, printers, facsimile devices and the likes using electrophotographic methods, demands have increased for image quality, reproducibility and the like which are better than those which have been obtained conventionally. Further, by making the diameter of toner particles smaller, improvements in image quality are frequently achieved.

Although making the particle diameter of a toner smaller is effective in improving image quality, the smaller the toner particle diameter, the worse the dispersability of the respective structural components of the toner. This is a cause of the charge amount distribution of the toner becoming uneven and broad, there being an increase in toner adhering to the non-image portions on the photosensitive body, and there being an increase in toner deposition of the background of images.

Further, the smaller the toner particle diameter, the greater the cohesion of the toner. The fluidity thereby deteriorates, and problems arise in that filming and the like on the photosensitive body occur easily and stable image quality cannot be obtained over a long period of time. This trend is particularly marked in cases in which carbon black is used as the coloring agent of the toner and an image forming device is used which recycles cleaned toner in the developing section.

Next, the color developing method will be described.

Copies which have been obtained by electrophotographic methods to date are generally single color. However, recently, the requirements and demands for color copies have increased. Currently, there is the trend to use, as electrostatic charge image developers for obtaining quality color copies, dry-type double-component color electrostatic charge image developers which are generally formed from a carrier and a toner of a small particle diameter.

With dry-type double-component color electrostatic charge image developers, at the toner which has a small particle diameter, the amount of charge per toner particle (hereinafter called "Q/M" upon occasion) is small. Thus, as the developing sleeve rotates, the toner easily scatters within the developing device. Further, in accordance therewith, scattering of the toner onto the image carrier becomes marked and appears as toner deposition of the background of images on the copies, and the quality of the copies therefore deteriorates. In particular, with color electrostatic charge image developers, it is said that if the toner density is not high as compared with that of monochrome electrostatic charge image developers, impressive images cannot be obtained. Accordingly, it is currently the situation that toners are used with the toner density thereof being set to be sufficiently high. However, an increase in the toner density is that much more disadvantageous in terms of toner scattering. To date, sufficient measures to counter toner scattering have not been taken. In a dry-type double-component color developing device, among the electrostatic charge image developers of the four colors of yellow, magenta, cyan, and black, carbon black, which is generally used as the coloring agent in the black electrostatic charge image developer, is an electrically conductive substance, and the electrical resistance thereof is low. When carbon black is dispersed within or contained in a toner, the electrical conductivity of the toner itself increases, and the chargeability deteriorates. Problems arise in that the toner deposition of the background of images and toner scattering easily occurs. Further, among the electrostatic charge image developers of the four colors, the amount of the black electrostatic charge image developer which is used is markedly high. Thus, among the above-described problems relating to toner scattering, scattering of black toner is a particularly great problem.

To address this problem, various solutions have been proposed such as including magnetic fine particles in the toner (JP-A No. 2-22673, JP-A No. 2-87158, and the like), making the color of the magnetic materials in the toners of the respective colors match the colors of the coloring agents in the toners of the respective colors so that the color characteristics do not change (so that hue offset does not occur) (JP-A No. 2-877, JP-A No. 2-207275, and the like), and the like.

Hereinafter, a developing method using a single-component electrostatic charge image developer will be described.

In recent years, as methods of developing latent electrostatic images by electrophotographic methods, electrostatic recording methods and the like, methods have become popular in which a developing magnet roller, which has a sleeve provided with a magnetic field generating means in the interior thereof, and a magnetic single-component toner are used in combination. Generally, the operation of developing a latent electrostatic image by a method using a magnetic single-component toner is carried out by rotating the sleeve, or rotating the magnet within the sleeve, or rotating both. Usually, developing is carried out by rotating the magnet. However, at this time, the rotational speed of the sleeve or the magnet is selected such that the moving speed of the magnetic toner is set to be 2 to 4 times that of the latent electrostatic image so that the pitch of the poles does not appear in the image. Thus, if an attempt is to be made to sufficiently ensure the uniformity of the image density, the rotation of the magnet must be made to be considerably fast, and a strong motor is required for this driving. This of course leads to the device becoming larger sized.

In order to overcome this drawback, a single-component electrostatic charge image developer which is not magnetic is disclosed in JP-B No. 41-9475. Here, a toner member having a thin layer of toner on the surface thereof is set in proximity with a latent electrostatic image forming body, and in light of the non-contact relationship thereof, the toner is made to fly onto only the latent electrostatic image. In this publication, the carrying of the toner is achieved by causing the toner to be attracted to and adsorbed at a web which is provided with an appropriate tackiness or a filmsheet to which charges have been given in advance. However, in this method, there are limits to the length of the sheet and the web, and this method is not suited for continuous copying or printing.

To overcome these problems, JP-A No. 60-229065 discloses a method in which a carrier for developing latent electrostatic images is made to be in an endless form, developing is carried out by the flying of a non-magnetic single-component toner, and the image is transferred onto a recording sheet. In this example, a uniformizing member is made to abut the developing roller such that a thin layer of toner is formed, and a developing bias such as a DC-superimposed AC or the like is applied such that the latent electrostatic image is developed. JP-A No. 50-30537 discloses a method of improving the image density by a pulse bias method. Further, JP-A No. 47-12635 and JP-A No. 50-10143 disclose structures of developing agent carriers having a fine pattern of insulator portions (dielectric portions) and electric conductor portions on the surface thereof. By using such fine electric fields, mountains and valleys of toners are formed in correspondence with the fine pattern, and toner is caused to adhere in correspondence with the electric potential levels of the latent electrostatic image, so as to aim for multilayering. In either method, the amount of electrostatic charge image developer on the latent electrostatic image carrier varies in accordance with the state in which the toner is applied onto the developing roller. Thus, the characteristics of the toner on the developing roller are important.

JP-A No. 58-116559 discloses various types of non-magnetic single-component developing methods which do not use carriers. With toners requiring a low melting point and sharp melting, if an external additive is caused to adhere to the toner surface for the purpose of improving the fluidity, by using a developing unit, the external additive is subjected to mechanical hazards such as at the time when the toner passes on a developing roller or a developer for latent electrostatic images applying blade or the like, and sinks into the toner surface. Thus, the characteristics of the toner on the developing roller are easily changed. In particular, a fluidity improving agent, which is applied externally for the purpose of improving the fluidity of the toner, causes changes in the toner characteristics by sinking into the toner surface. Thus, as before, there are problems to be solved such as stabilizing the amount of charge of the toner on the developing roller over time, stably ensuring a sufficient amount of electrostatic charge image developer to the latent electrostatic image carrier, preventing fogging of the background portions on the image, and the like.

A toner which is used in such a non-magnetic single-component developing method is a toner in which a coloring agent and the like are dispersed in a binder resin. Carbon black has been effectively used as a general, non-magnetic, black coloring agent. However, due to the structure thereof, carbon black has an electrical conductivity imparting effect. In particular, when a large amount of carbon black is used for the purpose of raising the degree of coloring, the electrical resistance of the toner decreases, and the charge retaining ability deteriorates. Thus, the chargeability deteriorates, and the amount of inversely-charged toner or lightly-charged toner which exists increases. Problems such as the scattering of toner, the so-called dirtying of background portions in which toner particles are developed on places other than the image portion where the latent electrostatic image is formed, and the like, can be seen, and there are limits on the amount of carbon black which can be contained. In particular, when the charge donating effect of the charge donating member weakens over time, insufficiently charged or weakly charged toner tinged with an inverse charge easily generates. Thus, such phenomena become marked.

In recent years, the demand on the market for images of high quality has increased. With toners having a conventional volume average particle diameter of 10 to 15 $\mu$m, a sufficiently high image quality cannot be obtained, and toners of even smaller particle diameters are required. However, as the trend toward making the toner particle diameter smaller advances, various problems tend to arise. In particular, because the adhesive property of the toner itself is strengthened, charge donating member and the like easily become dirty by the toner. Charge donating ability of the charge donating member easily deteriorates over time, and there is less leeway with respect to toner deposition of the background of images and toner scattering.

SUMMARY OF THE INVENTION

The object of the present invention is to provide a toner for developing latent electrostatic images, a developer for latent electrostatic images, a container containing toner, an image forming device, and an image forming method which overcome the above-described problems of the prior art, and in which, in particular, even if a large number of images of large image areas are output continuously, toner deposition of the background of images and toner scattering and the like do not occur, and which have excellent fluidity, and in which filming and the like do not occur, and in which, even if a small particle diameter toner is used, it is possible to obtain stable image quality over a long period of time.

As the result of intensive investigation, the inventors of the present invention arrived at a first aspect of the present invention by discovering that, by using, as a toner for a single-component electrostatic charge image developer or a toner for a double-component electrostatic charge image developer, a toner which contains in a binder resin at least a coloring agent formed from a metal material, and which satisfies the relationships that the saturation magnetization is 0.01 to 10 emu/g and the true specific gravity is 1.33 to 1.62 g/cm$^3$, even when a large number of images having large image surface areas are continuously output, toner deposition of the background of images, toner scattering and the like do not occur, the fluidity is excellent, there is little filming or the like, and even when a small particle diameter toner is used, stable image quality can be obtained over a long period of time.

Such a toner, which is weakly-magnetic and is almost non-magnetic and which has a true specific gravity which is near to that of a toner using a conventional carbon black, has not existed heretofore.

In a second aspect of the present invention, there is provided a container containing toner in which a toner for developing latent electrostatic images is housed in a toner container, the toner containing, in a binder resin, at least a coloring agent formed from a metal material, a saturation magnetization of the toner being 0.01 to 10 emu/g, and a true specific gravity of the toner being 1.33 to 1.62 g/cm$^3$.

In a third aspect of the present invention, there is provided a developer for a latent electrostatic image comprising at least a toner for developing latent electrostatic images, the toner containing, in a binder resin, at least a coloring agent formed from a metal material, a saturation magnetization of the toner being 0.01 to 10 emu/g, and a true specific gravity of the toner being 1.33 to 1.62 g/cm$^3$.

A fourth aspect of the present invention an image forming method comprising a latent electrostatic image forming step of forming a latent electrostatic image on a latent electrostatic image carrier; and a developing step of developing the electrostatic latent image by using an electrostatic charge image developer housed in a developing device, the electrostatic charge image developer containing at least a toner for developing latent electrostatic images, the toner containing, in a binder resin, at least a coloring agent formed from a metal material, a saturation magnetization of the toner being 0.01 to 10 emu/g, and a true specific gravity of the toner being 1.33 to 1.62 g/cm³.

Finally, a fifth aspect of the present invention provides an image forming device comprising a latent electrostatic image carrier; a latent electrostatic image forming means for forming a latent electrostatic image on the electrostatic latent image carrier; and developing means for housing an electrostatic charge image developer containing at least a toner for developing latent electrostatic images, the toner containing, in a binder resin, at least a coloring agent formed from a metal material, a saturation magnetization of the toner being 0.01 to 10 emu/g, and a true specific gravity of the toner being 1.33 to 1.62 g/cm³, and for developing the electrostatic latent image.

DESCRIPTION OF THE PREFERRED EMBODIMENTS

Figure 1:
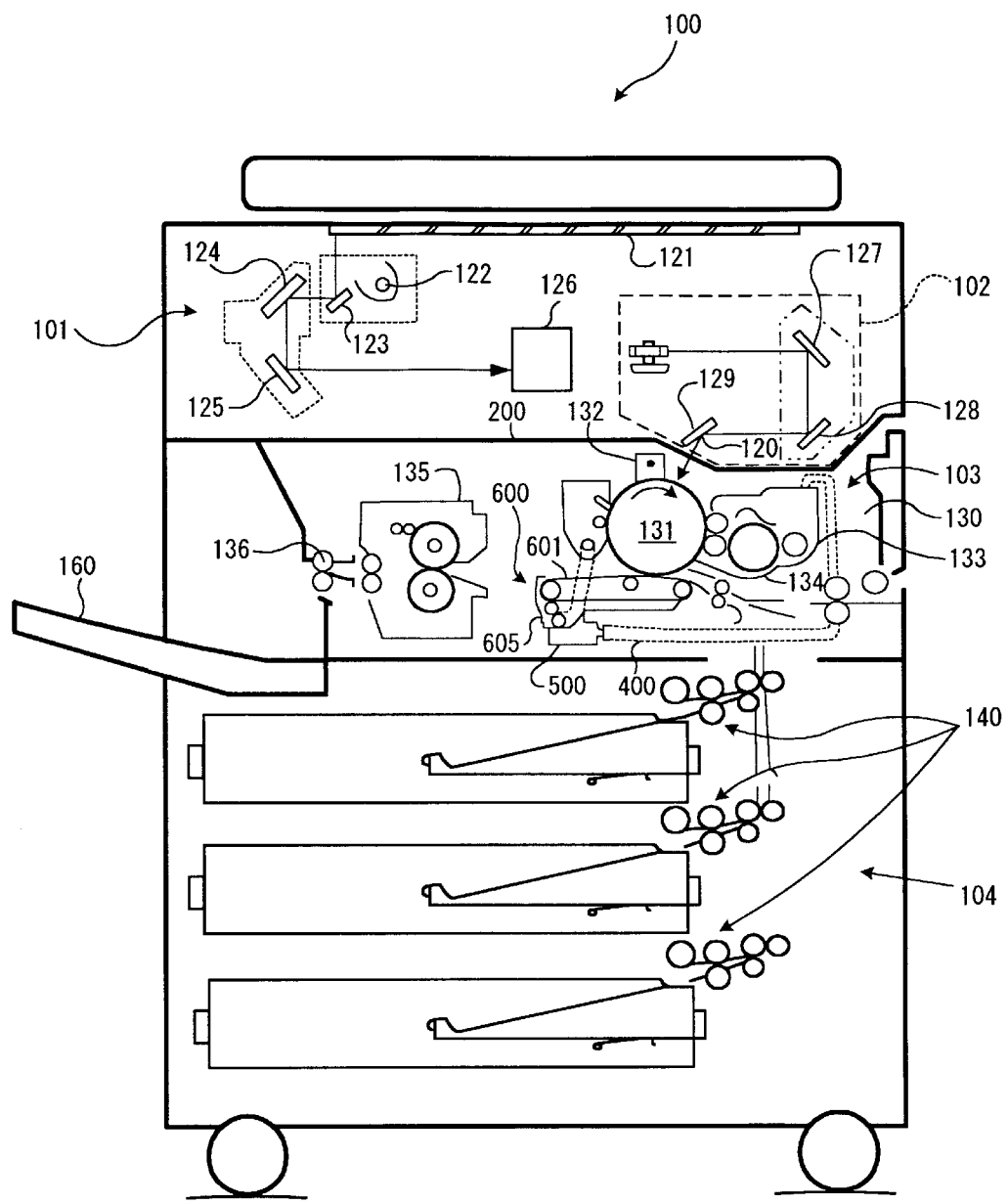
FIG. 1 is a schematic structural view illustrating an example of an image forming device and method in which a developing method of the present invention is applied to an image forming method using a double-component electrostatic charge image developer.

Details of the present invention are described hereinafter.

The toner for developing latent electrostatic images of the present invention contains, in a binder resin, at least a coloring agent formed from a metal material, and the saturation magnetization of the toner is 0.01 to 10 emu/g, and the true specific gravity of the toner is 1.33 to 1.62 g/cm³.

The toner for developing latent electrostatic images of the present invention can, depending on the form thereof, be used as a toner for a double-component electrostatic charge image developer, or as a toner for a single-component electrostatic charge image developer. Due to the toner of the present invention containing a coloring agent formed from a metal material and satisfying the aforementioned relations of saturation magnetization and true specific gravity, the toner of the present invention can overcome the above-described conventional drawbacks of toners for double-component electrostatic charge image developers and toners for single-component electrostatic charge image developers.

A toner for a double-component electrostatic charge image developer is used in an image forming method in which, by stirring by a stirring means a double-component electrostatic charge image developer containing a toner and a carrier, the toner particles are rubbed and charged, and the double-component electrostatic charge image developer which includes the charged particles is carried on a substantially hollow cylindrical electrostatic charge image developer carrier which is rotatable and which has a magnetic field generating process in the interior thereof, and a latent electrostatic image formed on the image carrier is developed. In a conventional toner for a double-component electrostatic charge image developer, a carbon black toner which mainly contains carbon black is used as a coloring agent in order to provide black color. However, carbon black is an electrically conductive substance, and is a high dielectric. Thus, when carbon black is dispersed within or included in the toner, the electrical conductivity of the toner itself increases and the resistance decreases. Therefore, with a carbon black toner, toner deposition of the background of images and toner scattering and the like easily occurs, the carbon black tend to receive effects such as charge injection, charge discharging and the like with respect to an external electrical field. As a result, although the rise in the charging is good, the release of charges becomes rapid, and the chargeability deteriorates over time. Thus, the durability tend to deteriorate, and the transferability tends to worsen.

Carbon black forms secondary cohered matter which are usually called agglomerates. The agglomerates must be dispersed uniformly to the primary particles. However, in actuality, dispersing to the primary particles is difficult. Usually, the agglomerates exist within the toner as primary cohered matter, which are called aggregates, or in a state similar thereto. Thus, the dispersability cannot be considered to be sufficient. It is thereby easy for the amount of charge to become non-uniform, and there is the tendency for toner deposition of the background of images and toner scattering to easily occur.

When a conventional magnetic toner containing magnetic materials or the like is used as a toner for a double-component electrostatic charge image developer, as compared with a non-magnetic toner using carbon black or the like, the saturation magnetization is high, and the magnetic constraining force on the electrostatic charge image developer carrier increases, and therefore, developability tends to deteriorate.

On the other hand, according to the present invention, due to the fact that the saturation magnification of the toner for developing latent electrostatic images is 0.01 to 10 emu/g and the toner has magnetism which is lower than that of a conventional, usual magnetic toner, a deterioration in developability due to an increase in the magnetic constraining force, which is a problem with conventional magnetic toners, can be prevented. Moreover, because the toner has a suitable magnetism, the toner is constrained by the electrostatic charge image developer carrier. In this way, adhesion of toner onto the non-image portions and scattering of toner, which are problems occurring with carbon black toners, can be greatly reduced. Further, in the image forming device and method of the present invention, by, in particular, providing a toner sorting mechanism by a magnetic field generating means at the recycling section, it is possible to prevent re-mixing-in, into the developing section, of fibers of the transfer paper which have become mixed in with the recovered toner, fillers such as talc, kaolin, calcium carbonate, and the like, suspended matter in the air, toner having low magnetism (e.g., fine powder toner), toner having low coloring ability in which the coloring agent is not sufficiently dispersed, and the like. In this way, it is possible to greatly suppress a deterioration in image density over time, an increase in toner deposition of the background of images and scattering of toner, generation of filming, and the like. In addition it is possible to prevent the generation of carrier spent due to fine powder toner, the generation of image defects such as uneven transfer and voids, and the like.

The true specific gravity of the toner for developing latent electrostatic images of the present invention is 1.33 to 1.62 g/cm$^3$, which is slightly high as compared to that of a conventional toner using carbon black. In this way, because the toner flows easily, good chargeability can be obtained. Moreover, because the difference in specific gravities of the toner and the carrier of the double-component electrostatic charge image developer is small, uniform mixability improves, and even when toner is replenished, the toner can be mixed together uniformly with the carrier in a short period of time. Thus, toner deposition of the background of images, scattering of toner and the like at the time of replenishing the toner can be greatly suppressed. In particular, even when a large number of images having large image surface areas are continuously output, and even in cases of using a small particle diameter toner for which it is even easier for the characteristics to deteriorate during recycling, good effects can be achieved and images of good quality can be obtained. Further, a toner whose true specific gravity is 1.33 to 1.62 g/cm$^3$ has a largeer true specific gravity than that of a conventional toner using carbon black. Thus, the precision of classification during manufacturing is improved, and as a result, high produceability can be achieved.

Further, in the above-described image forming device, by providing a toner sorting mechanism by a classifying means at the recycling section, it is possible to prevent re-mixing-in into the developing section of fibers of the transfer paper which have become mixed in with the recovered toner, fillers such as talc, kaolin, calcium carbonate, and the like, suspended matter in the air, and toner whose characteristics have deteriorated, such as cohered toner or the like. In this way, it is possible to greatly suppress a deterioration in image density over time, an increase in the dirtying of background portions and the scattering of toner, generation of filming, and the like. In addition, the generation of image defects such as uneven transfer and voids, and the like can be suppressed.

The saturation magnetization of the toner for developing latent electrostatic images is 0.01 to 10 emu/g, and preferably 0.01 to 4 emu/g, and as a toner for a double-component electrostatic charge image developer, particularly preferably 0.05 to 4 emu/g. If the saturation magnetization of the toner is less than 0.01 emu/g, the magnetic conveying force becomes weak, which leads to cause a toner scattering, uneven development, and the like. Moreover, because the rubbing effect of the surface of the photosensitive body is insufficient, filming tends to occur. In particular, in a case in which an image forming device, which uses a magnetic field generating means at the recycling section, is used, it is difficult to recycle the recovered toner.

On the other hand, if the saturation magnetization exceeds 10 emu/g, the magnetic constraining force of the carrier, the developing sleeve and the like with respect to the electrostatic charge image developer carrier and the like increases. Thus, the developability deteriorates, and as a result, the image density deteriorates. Moreover, because it becomes difficult for the toner to separate from the carrier surface, there is the problem that the toner easily fuses to the carrier surface, and easily causing so-called carrier spent to occur. Further, fixability easily deteriorates.

The true specific gravity of the toner for developing latent electrostatic images is 1.33 to 1.62 g/cm$^3$, preferably 1.35 to 1.60 g/cm$^3$, more preferably 1.35 to 1.55 g/cm$^3$, and particularly preferably 1.40 to 1.55 g/cm$^3$. If the true specific gravity of the toner is less than 1.33 g/cm$^3$, it is difficult for the toner to flow, and the chargeability deteriorate. If a large amount of an additive is included in order to compensate for this deterioration, chattering, burring of the plate, and the like caused by deficient cleaning of the photosensitive body tend to occur, and filming on the photosensitive body and the like easily occurs due to the additive which becomes free from the toner. Various problems arise such as the durability of the cleaning plate, the photosensitive body and the like deteriorate, and the fixability as well deteriorates easily. Moreover, in a case in which a double-component electrostatic charge image developer is used, because the difference in the specific gravities of the toner and the carrier is great, the ability of the toner and the carrier to be mixed together uniformly deteriorates. Therefore, the ability of the charge of the toner to rise at the time toner is replenished deteriorates, and toner deposition of the background of images, scattering of toner, and the like easily occurs. Further, when using an image forming device which, at the recycling section, uses a classifying sorting means utilizing the difference in specific gravities, because the difference in the specific gravities of the toner and the adhered matter such as the fibers and fillers and the like of the transfer paper or the like, which adhered matter has a low specific gravity, is small, the precision of classifying the recovered toner easily deteriorates.

On the other hand, if the true specific gravity of the toner exceeds 1.62 g/cm$^3$, the number of toner particles per unit weight decreases, the charge amount per particle increases, and the conveyability of the toner to the electrostatic charge image developer carrier deteriorates. Thus, the tendency toward a deterioration in the developability can be seen. Because the toner weight required per the same amount of adhesion also increases, the amount of toner which is consumed increases, which is related to an increase in costs, which is not preferable.

The measurement of the true specific gravity of the toner is carried out by using an air comparator type specific gravity meter 930 (manufactured by Beckman Japan KK).

On the other hand, a toner for a single-component electrostatic charge image developer is used in an image forming method in which an electrostatic charge image developer for developing latent electrostatic images, which has a toner and is housed in a developing container, is carried on an electrostatic charge image developer carrier, and while an electrostatic charge image developer layer is formed on the electrostatic charge image developer carrier by an electrostatic charge image developer layer thickness regulating member, the electrostatic charge image developer layer is conveyed to a developing region which opposes a latent image carrier (hereinafter called "electrostatic latent image carrier" or "photosensitive body" upon occasion), and the latent image on the latent image carrier is developed by the electrostatic charge image developer so as to form a visible image.

The saturation magnetization of the toner for developing latent electrostatic images is 0.01 to 10 emu/g, and as a toner for a single-component electrostatic charge image developer, preferably 0.01 to 3 emu/g. By using a toner whose saturation magnetization is 10 emu/g or less, toner deposition of the background of images, scattering of toner and the like, which are problematic at the time of using a conventional, magnetic toner for a single-component electrostatic charge image developer and which occur at the time of generation of weakly-charged toner or inversely charged toner which moves easily onto non-image portions, can be suppressed by preventing movement of the toner to the non-image portions by the magnetic constraining force. Further, it is possible to make the developing device more compact because the magnetic characteristic level is such that there is no need to use a strong driving motor, which is an impediment to making the device more compact when a magnetic toner is used.

If the saturation magnetization is less than 0.01 emu/g, the magnetic conveying force weakens, which easily becomes a cause of toner scattering and non-uniform development. Moreover, because the effect of polishing the surface of the photosensitive body is insufficient, filming easily occurs. On the other hand, if the saturation magnetization exceeds 10 emu/g, the magnetic constraining force on the developing sleeve increases, causes the developability to easily deteriorate, and the driving motor itself must be made to be relatively strong which is an impediment to making the device more compact.

Further, the true specific gravity of the toner for developing latent electrostatic images is 1.33 to 1.62 g/cm$^3$, which is large as compared to regular magnetic toners. In this way, because the toner easily flows, good chargeability as well as high quality images can be obtained.

The true specific gravity is 1.33 to 1.62 g/cm$^3$, and 1.35 to 1.60 g/cm$^3$ is preferable, and 1.35 to 1.55 g/cm$^3$ is more preferable, and 1.40 to 1.55 g/cm$^3$ is particularly preferable.

If the true specific gravity of the toner is less than 1.33 g/cm$^3$, it is difficult for the toner to flow and the chargeability deteriorates. If a large amount of an external additive is included for the purpose of compensating for this deterioration, there is the drawback that various types of problems occur.

On the other hand, if the true specific gravity of the toner exceeds 1.62 g/cm$^3$, the developability deteriorates, and the weight of the toner needed per the same adhered amount becomes large. Thus, there are the drawbacks that the system is disadvantageous from the standpoint of costs, the specific gravity increases although the magnetic constraining force is low, and there is an increase in the size of the device accompanying the use of a strong driving motor due to the increased torque for stirring the toner. Accordingly, there are appropriate ranges for the fluidity of the toner of the device and, in order to make the device more compact, for the true specific gravity as well. The toner for developing latent electrostatic images of the present invention falls within these appropriate ranges.

The metal material is not particularly limited, provided that it is a metal material, such as a metal, a metal oxide, an alloy, or the like, by which the saturation magnetization and the true specific gravity at the time of forming the toner for developing latent electrostatic images can be satisfied. However, hematite, maghemite and the like, at whose surface exists one or two or more types of compounds which are selected from compounds of the respective elements of Mn, Ti, Cu, Si and C, are preferable. Or, a metal material which provides a desired color due to a surface treatment by a pigment and/or dye may be used.

Examples of the material which can be used in the surface treatment of the metal material are dyes and pigments such as carbon black, iron black, Aniline Black, graphite, fullerene, and the like which are for providing black color. Further, dyes and pigments or compounds or the like, in which black color is made to appear by using a plurality of dyes and pigments or compounds in combination, may also be used.

Further, as the metal material, as the aforementioned metal material, it is possible to use substances to which have been added compounds of lead, tin, aluminum, antimony, sodium, magnesium, phosphorus, sulfur, potassium, calcium, chromium, cobalt, selenium, beryllium, bismuth, cadmium, nickel, tungsten, vanadium, zinc, chlorine, and the like.

In addition to the coloring agent formed from a metal material, the toner for developing latent electrostatic images may also include known coloring agents. Examples of known black coloring agents are metal salt azo dyes or azine dyes such as carbon black, oil furnace black, channel black, lamp black, spirit black, acetylene black, Aniline Black or the like. For the black toner, the black coloring agent is used in combination in a range of 0.01 to 10 wt %, preferably 0.01 to 5 wt %, and more preferably 0.01 to 3 wt %, with respect to a total weight of the toner. It is possible to use a blue color coloring agent such as copper phthalocyanine blue or the like in combination as an auxiliary color. Although the addition of a small amount of coloring agent such as the aforementioned carbon black, oil furnace black, or the like is excellent from the standpoint of adjusting the color and in order to increase the degree of black color, it is preferable to not include a coloring agent from the standpoints of electrical resistivity and dispersability. Further, if the contained amount exceeds 5 wt %, the electrical resistivity of the toner decreases and the dispersability is insufficient. Thus, toner deposition of the background of images and toner scattering easily occurs, and for non-uniform development to occur because a magnetic conveying force cannot be obtained. Because the effect of polishing of the surface of the photosensitive body is insufficient, filming easily occurs.

Examples of known yellow, magenta and cyan coloring agents are the following.

Examples of Yellow Coloring Agents

C.I. Pigment Yellow 1: Symuler Fast Yellow GH (manufactured by Dainippon Ink and Chemicals, Incorporated)

C.I. Pigment Yellow 3: Symuler Fast Yellow 10GH (manufactured by Dainippon Ink and Chemicals, Incorporated)

C.I. Pigment Yellow 12: Symuler Fast Yellow GF (manufactured by Dainippon Ink and Chemicals, Incorporated)

C.I. Pigment Yellow 13: Symuler Fast Yellow GRF (manufactured by Dainippon Ink and Chemicals, Incorporated)

C.I. Pigment Yellow 14: Symuler Fast Yellow SGR (manufactured by Dainippon Ink and Chemicals, Incorporated)

C.I. Pigment Yellow 17: Symuler Fast Yellow 8GR (manufactured by Dainippon Ink and Chemicals, Incorporated)

Yellow 152 (manufactured by Arimoto Chemical Co., Ltd.) as C.I. Pigment 12

Pigment Yellow GRT (manufactured by Sanyo Color Works, Ltd.)

Sumikaprint Yellow ST-O (manufactured by Sumitomo Chemical Co., Ltd.)

Benzidine Yellow 1316 (manufactured by Noma Chemical Industry Co., Ltd.)

Seika Fast Yellow 2300 (manufactured by Dainichiseika Color & Chemicals Mfg. Co., Ltd.)

Lionol Yellow GRT (manufactured by Toyo Ink Mfg. Co., Ltd.)

Examples of Magenta Coloring Agents

C.I. Pigment Red 81: Symuler Rhodamine Y Toner F (manufactured by Dainippon Ink and Chemicals, Incorporated)

C.I. Pigment Red 122

C.I. Pigment Red 57: Symuler Brill Carmine LB (manufactured by Dainippon Ink and Chemicals, Incorporated)

C.I. Pigment Red 22: Symuler Fast Brill Scarlet BG (manufactured by Dainippon Ink and Chemicals, Incorporated)

C.I. Pigment Red 21: Sanyo Fast Red GR (manufactured by Sanyo Color Works, Ltd.)

C.I. Pigment Red 18: Sanyo Tolvidine Mayoon Medium (manufactured by Sanyo Color Works, Ltd.)

C.I. Pigment Red 114: Symuler Fast Carmine BS (manufactured by Dainippon Ink and Chemicals, Incorporated)

C.I. Pigment Red 112: Symuler Fast Red FGR (manufactured by Dainippon Ink and Chemicals, Incorporated)

C.I. Pigment Red 5: Symuler Fast Carmine FB (manufactured by Dainippon Ink and Chemicals, Incorporated)

Examples of Cyan Coloring Agents

C.I. Pigment Blue 15: Fastogen Blue GS (manufactured by Dainippon Ink and Chemicals, Incorporated), Chromobine SR (manufactured by Dainichiseika Color & Chemicals Mfg. Co., Ltd.)

C.I. Pigment Blue 16: Sumitone Cyanine Blue LG (manufactured by Sumitomo Chemical Co., Ltd.)

C.I. Pigment Green 7: Phthalocyanine Green (manufactured by Toyo Ink Mfg. Co., Ltd.)

C.I. Pigment Green 36: Cyanine Green 2YL (manufactured by Toyo Ink Mfg. Co., Ltd.)

C.I. Pigment Blue 15:13: Cyanine Blue GGK (manufactured by Nippon Pigment Co., Ltd.)

In this way, the metal material having the above-described structure can provide a black color. Thus, the coloring agent formed from the metal material can function as a black color coloring agent in place of carbon black or the like. By using such a material, filming and the like due to the effect of polishing the photosensitive body can be prevented.

The average particle diameter of the metal material is preferably 0.01 to 0.8 $\mu$m, and more preferably 0.02 to 0.5 $\mu$m. If the average particle diameter is less than 0.01 $\mu$m, dispersability into the binder resin deteriorates, and the fixability as well is poor. Further, if the average particle diameter exceeds 0.8 $\mu$m, a sufficient degree of coloring cannot be obtained, and the dispersability into the binder resin is also poor.

The contained amount of the metal material is preferably 5 to 50 parts by weight, more preferably 5 to 40 parts by weight, and particularly preferably 10 to 25 parts by weight, with respect to 100 parts by weight of the binder resin. If the contained amount of the metal material is less than 5 parts by weight, the coloring power of the toner deteriorates and the effect of polishing the surface of the photosensitive body is insufficient. Thus, filming easily occurs. In particular, in a case of using an image forming device which uses a magnetic field generating means at the recycling portion, the saturation magnetization of the toner deteriorates, and thus, recycling of the recovered toner is difficult. If the contained amount is greater than 50 parts by weight, the metal material coheres and dispersability deteriorates, and due to a deterioration in the chargeability, the developability worsens. Further, because the percentage content of the binder resin in the toner is relatively low, the fixing strength of the toner to the paper, which is a toner property which derives from the binder resin, decreases. The toner peels off from the image after fixing, and deteriorations in image quality, such as disturbing of the image, bleeding and the like, easily occurs.

The magnetic characteristics of the metal material are not particularly limited, but the saturation magnetization preferably falls within the range of 0.05 to 60 emu/g, and particularly preferably is 0.1 to 40 emu/g. If the saturation magnetization is too large, the metal materials easily cohere together due to magnetism, and because the saturation magnetization of the toner also increases, the magnetic constraining force of the toner with respect to the developing carrier, such as the carrier or the developing sleeve or the like, increases. Thus, the developability deteriorates, and the image density decreases. Further, because the toner hardly separates from the carrier surface, the toner easily fuses to the carrier surface, a so-called carrier spent easily occurs. Moreover, the fixability as well deteriorates.

The dielectric dissipation factor of the toner is preferably $2.5 \times 10^{-3}$ to $7.5 \times 10^{-3}$, and particularly preferably $2.5 \times 10^{-3}$ to $5.0 \times 10^{-3}$. By making the dielectric dissipation factor of the toner fall within the range of $2.5 \times 10^{-3}$ to $7.5 \times 10^{-3}$, the dispersed state of the coloring agent and the like in the toner is uniform, and is a finely dispersed state. The charge amount distribution of the toner is thereby controlled within a constant, narrow range, and an excellent charge retaining ability and stability are obtained. If the dielectric dissipation factor of the toner is too high, the electrical conductivity is high, and therefore, poor charging occurs, and a tendency for toner deposition of the background of images and toner scattering to increase can be seen. Moreover, because the dispersability of the coloring agent and the like in the toner deteriorates, the charge amount distribution of the toner is not uniform, and high quality images cannot be obtained stably. Moreover, if the dielectric dissipation factor of the toner is too low, because the resistance increases, the charge amount rises, and a trend toward a deterioration in image quality can be seen. The measurement of the dielectric dissipation factor of the toner was carried out as follows. First, toner, which was molded in a pellet shape of a thickness of about 2 mm, was set at an electrode for a solid (SE-70manufactured by Ando Electric Co., Ltd.). Then, the phase offset at the time when an alternating current of 1 kHz was applied between the electrodes was measured by a dielectric loss measurer (TR-10C manufactured by Ando Electric Co., Ltd.), and the dielectric dissipation factor of the toner was calculated therefrom.

The residual magnetization of the toner of the present invention is preferably 4 emu/g or less, and particularly preferably 1 emu/g or less. If the residual magnetization of the toner is too high, the dispersability and the durability tend to worsen.

Further, it is preferable that the coercive force of the toner be 50 Oe or less. If the coercive force of the toner is too high, the coherence between toner particles becomes strong, and the fluidity of the toner may deteriorate. Here, in measuring the magnetic characteristics of the coloring agent and the toner, a magnetization measuring device BHU-60 manufactured by Riken Denshi KK was used to determine the saturation magnetization, the residual magnetization, and the coercive force from a history curve at the time when a magnetic field was swept to 10 kOe on a toner which was filled in a cell having an internal diameter of 7 mm$\phi$ and a height of 10 mm.

Conventionally known binder resins can be used as the binder resin which is used in the toner of the present invention. For example, styrenes such as polystyrene, poly-p-styrene, polyvinyltoluene, or the like, or single polymers of substitution products thereof; styrene copolymers such as styrene-p-chlorostyrene copolymer, styrene-propylene copolymer, styrene-vinyltoluene copolymer, styrene-methyl acrylate copolymer, styrene-ethyl acrylate copolymer, styrene-methacrylate copolymer, styrene-methyl methacrylate copolymer, styrene-ethyl methacrylate copolymer, styrene-butyl methacrylate copolymer, styrene-α-methyl chloromethacrylate copolymer, styrene-acrylonitrile copolymer, styrene-vinylmethyl ether copolymer, styrene-vinylmethyl ketone copolymer, styrene-butadiene copolymer, styrene-isopropyl copolymer, styrene-maleate copolymer, and the like; polymethyl methacrylate, polybutyl methacrylate, polyvinyl chloride, polyvinyl acetate, polyethylene, polyester, polyurethane, epoxy resin, polyvinyl butyral, polyacrylic resin, rosin, denatured rosin, terpene resin, phenol resin, aliphatic or aliphatic hydrocarbon resins, aromatic petroleum resins, and the like, can be used singly or mixed together.

Among the above-listed compounds, polyester resin has a sharp melt property, and even at a low molecular weight, cohesion of the resin is strong. Thus, polyester resin is a resin with which easily achieves both low temperature fixability and offset resistance. For these reasons, polyester resin is preferable. Further, when polyester resin and other resins are used in combination, it is preferable for 80% by weight or more of the binder resin to be polyester resin so that the good characteristics which the polyester resin has do not suffer.

The polyester resin is preferably a polyester resin obtained by reacting:

(a) at least one type selected from any of bivalent carboxylic acids, and lower alkyl esters thereof and acid anhydrides thereof;

(b) a diol component expressed by following general formula (I):

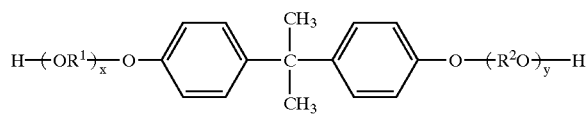

(I)

(in the formula, $R^1$ and $R^2$ may be the same or different, and are each an alkylene group having from 2 to 4 carbon atoms; and x and y are positive integers whose sum is from 2 to 16); and (c) at least one type selected from any of polyvalent carboxylic acids which are trivalent or more, and lower alkyl esters thereof and acid anhydrides thereof, and polyvalent alcohols which are trivalent or more.

Examples of the bivalent carboxylic acids, and lower alkyl esters and acid anhydrides thereof of above (a) are terephthalic acid, isophthalic acid, sebacic acid, isodecyl succinate, maleic acid, fumaric acid, and monomethyl, monoethyl, dimethyl, and diethyl esters thereof, and phthalic anhydride, maleic anhydride, and the like. In particular, terephthalic acid, isophthalic acid and dimethyl esters thereof are preferable from the standpoints of blocking resistance and cost. These bivalent carboxylic acids, and lower alkyl esters and acid anhydrides thereof greatly affect the fixability and the blocking resistance of the toner. Namely, although it depends on the degree of condensation, when a large amount of an aromatic terephthalic acid or isophthalic acid or the like is used, the blocking resistance improves, but the fixability deteriorates. Conversely, if a large amount of sebacic acid, isodecyl succinic acid, maleic acid, fumaric acid or the like is used, the fixability improves but the blocking resistance deteriorates. Accordingly, these bivalent carboxylic acids are to be selected appropriately and used singly or in combination, in accordance with the compositions, ratios, and degrees of condensation of other monomers.

Examples of the diol component expressed by general formula (I) of above (b) are polyoxypropylene-(n)-polyoxyethylene-(n')-2,2-bis(4-hydroxyphenyl)propane, polyoxypropylene-(n)-2,2-bis(4-hydroxyphenyl)propane, polyoxyethylene-(n)-2,2-bis(4-hydroxyphenyl)propane, and the like. In particular, polyoxypropylene-(n)-2,2-bis(4-hydroxyphenyl)propane in which $2.1 \leq n \leq 2.5$, and polyoxyethylene-(n)-2,2-bis(4-hydroxyphenyl)propane in which $2.0 \leq n \leq 2.5$, are preferable. Such diol components have the advantages that the glass transition temperature is improved, and the reaction is easy to control.

Aliphatic diols such as ethylene glycol, diethylene glycol, 1,2-butanediol, 1,3-butanediol, 1,4-butanediol, neopentyl glycol, propylene glycol, and the like may also be used as the diol component.

However, as compared with the diols expressed by above general formula (I), these aliphatic diols are soft and easily lowers the glass transition temperature. Thus, if an excessive amount is added, not only is the offset resistance insufficient, but also, fusibility between toner particles increases, and additives and the like easily sink, and thus, cohesion easily occurs.

Examples of the polyvalent carboxylic acids which are trivalent or more, and lower alkyl esters thereof and acid anhydrides thereof, of above (c) are 1,2,4-benzenetricarboxylic acid (trimellitic acid), 1,3,5-benzenetricarboxylic acid, 1,2,4-cyclohexanetricarboxylic acid, 2,5,7-naphthlenetricarboxylic acid, 1,2,4-naphthalenetricarboxylic acid, 1,2,4-butanetricarboxylic acid, 1,2,5-hexatricarboxylic acid, 1,3-dicarboxyl-2-methyl-2-methylenecarboxypropane, tetra(methylenecarboxy) methane, 1,2,7,8-octanetetracarboxylic acid, enpole trimer acids, and monomethyl, monoethyl, dimethyl, and diethyl esters thereof, and the like.

Examples of the polyvalent alcohol which is trivalent or more of above (c) are sorbitol, 1,2,3,6-hexanetetrol, 1,3-sorbitan, pentaerythritol, dipentaerythritol, tripentaerythritol, saccharose, 1,2,4-butanetriol, 1,2,5-pentatriol, glycerol, diglycerol, 2-methylpropanetriol, 2-methyl-1,2,4-butanetriol, trimethylolethane, trimethylolpropane, 1,3,5-trihydroxymethylbenzene, and the like.

Among these monomers which are trivalent or more, in particular, benzenetricarboxylic acids such as benzenetricarboxylic acid, acid anhydrides thereof and esters thereof and the like, are preferable from the standpoint of achieving both fixability and offset resistance. Moreover, when a toner using a benzenetricarboxylic acid is used in an image forming device which recycles, at a developing section, toner which has been recovered from an image carrier such as a photosensitive body, an intermediate transfer body, a transfer belt, or the like, it is difficult for breakage of the toner particles due to mechanical external forces such as rubbing, stirring or the like at the time of movement to the cleaning portion or developing portion, to occur. Thus, this is preferable because there is little change in the toner particle diameter over time, and good effects with respect to durability and the like can be obtained.

The mixing ratio of the above polyvalent monomer which is trivalent or more is preferably about 1 to 30 mol % of the entire monomer composition. If the ratio is less than 1 mol %, the offset resistance of the toner deteriorates, and the durability tends to worsen as well. On the other hand, if the ratio exceeds 30 mol %, the fixability of the toner tends to deteriorate.

The glass transition temperature (Tg) of the above binder resin is, from the standpoint of heat-resistant storability and the like, preferably 55° C. or more, and particularly preferably 60° C. or more.

The method of producing the above binder resin is not particularly limited, and any of mass polymerization, solution polymerization, emulsion polymerization, suspension polymerization, and the like can be used.

Mold releasing agents, charge control agents, additives and the like can be added to the toner of the present invention as needed.

Conventionally known mold releasing agents can be used in the toner of the present invention. In particular, it is preferable to use free fatty acid removed type carnauba wax, montan wax, or oxidized rice wax singly or in combination.

A microcrystalline carnauba wax may be used, and a carnauba wax whose acid value is 5 or less and whose particle diameter when dispersed in the binder resin is 1 μm or less is particularly preferable.

Montan wax generally means a montan-type wax which is refined from minerals, but, in the same way as carnauba wax, a montan wax which is microcrystalline and has an acid value of 5 to 14 is preferable.

Oxidized rice wax is obtained by air oxidation of rice bran wax, and the acid value thereof is preferably 10 to 30.

Examples of other mold releasing agents are solid silicone wax, high fatty acid higher alcohols, montan-type ester waxes, low molecular weight polypropylene wax, and the like. These mold releasing agents may be used in a state of being mixed together with any other conventionally known mold releasing agents.

The melting point of the above mold releasing agents is preferably 75 to 125° C. By making the melting point to be 75° C. or more, the toner can be made to have excellent durability. Further, by making the melting point to be 125° C. or less, the mold releasing agent melts quickly at the time of fixing, and a reliable mold releasing effect can be exhibited.

The contained amount of the mold releasing agent is preferably 1 to 20 parts by weight, and particularly preferably 2 to 10 parts by weight, with respect to 100 parts by weight of the binder resin. If the contained amount of the mold releasing agent is too low, the offset preventing effect is insufficient, and if the contained amount is too high, durability and the like deteriorate.

Here, the melting point of the releasing agent was measured as follows. The melting point was measured under the condition of a temperature raising speed of 10° C./min by a melting point measuring device manufactured by Rigaku Denki Co. (the Rigaku THERMOFLEX TG8110). The subject maximum peak of the heat adsorption curve was the melting point.

Conventionally known charge control agents can be used in the toner of the present invention. First, examples of charge control agents which control the positive chargeability of the toner are nigrosine and modified products thereof; quaternary ammonium salts such as tributylbenzylammonium-1-hydroxy-4-naphthosulfonate, tetrabutylammoniumtetrafluoroborate, and the like; diorgano tin oxides such as dibutyl tin oxide, dioctyl tin oxide, dicyclohexyl tin oxide and the like; diorgano tin borates such as dibutyl tin borate, dioctyl tin borate, dicyclohexyl tin borate, and the like; and the like. Further, examples of charge control agents which control the negative chargeability of the toner are azo metal complexes and salts such as azo iron complex or the like, salicylic acid metal complexes and salts, organic boric acid salts, calyxallene type compounds, and the like. These maybe used singly or in a combination of two or more types.

The contained amount of the above charge control agent is preferably 0.1 to 10 parts by weight, and particularly preferably 1 to 5 parts by weight, with respect to 100 parts by weight of the binder resin.

Conventionally known additives can be used as additives in the toner of the present invention. Specific examples are oxides, complex oxides and the like of Si, Ti, Al, Mg, Ca, Sr, Ba, In, Ga, Ni, Mn, W, Fe, Co, Zn, Cr, Mo, Cu, Ag, V, Zr, and the like. In particular, silica and titania, which are oxides of Si and Ti, are suitably used from the standpoints of improving the fluidity, charge stabilization, recyclability, and the like.

The added amount of the additive is preferably 0.1 to 5 parts by weight, and particularly preferably 0.5 to 2 parts by weight with respect to 100 parts by weight of the mother particles. If the added amount of the additive is too low, the fluidity of the toner deteriorates. Thus, sufficient chargeability cannot be obtained, and the transferability and heat-resistant stability are also insufficient. Further, toner deposition of the background of images and toner scattering easily occurs. If the added amount of the additive is too large, although the fluidity improves, deficient cleaning of the photosensitive body, such as chattering, stripping off of the plate, and the like tend to occur, and filming on the photosensitive body and the like easily occurs due to the additive which becomes free from the toner. The durability of the cleaning plate, the photosensitive body and the like deteriorates, and the fixability as well deteriorates.

There are various methods of measuring the contained amount of the toner, but the contained amount is generally determined by a fluorescent X-ray analysis method. Namely, for a toner for which the contained amount of additive is known, a calibration curve is prepared by a fluorescent X-ray analysis method. By using this calibration curve, the contained amount of additive can be determined.

As needed, the above additives may be subjected to a surface treatment for the purposes of hydrophobization, improvement of fluidity, control of the chargeability, and the like. As the treating agent used in the surface treatment, organic silane compounds are preferable, and examples thereof include alkylchlorosilanes such as methyltrichlorosilane, octyltrichlorosilane, dimethyldichlorosilane, and the like; alkylmethoxysilanes such as dimethyldimethoxysilane, octyltrimethoxysilane, and the like; hexamethyldisilazane, silicon oil, and the like.

Examples of the method of treatment include a method of immersing an additive into a solution containing an organic silane compound, and carrying out drying, a method of spraying a solution containing a silane coupling agent onto the additive, and carrying out drying, and the like. In the present invention, either method can be suitably used.

From the standpoint of imparting fluidity and the like, the average primary particle diameter of the above additive is preferably 0.002 to 0.1 μm, and particularly preferably 0.005 to 0.05 μm.

If the average primary particle diameter is too small, the additive easily sinks into the surface of the mother particles. Thus, cohesion easily occurs, and fluidity cannot be sufficiently obtained. Further, filming tends to occur on the photosensitive body. These phenomena are apparent under high-temperature, high-humidity conditions. Further, cohesion of additives easily occurs, and for this reason as well, sufficient fluidity cannot be obtained. In particular, when using an image forming device which recycles, at a developing section, the toner which has been recovered from an image carrier such as a photosensitive body, an intermediate transfer body, a transfer belt or the like, because the fluidity worsens, the conveyability at the time of moving to the developing section deteriorates. Further, during moving to the cleaning section, the developing section or the like, mechanical external forces such as rubbing, stirring and the like are received, and thus, cohesion tends to occur. As a result, when these toners are mixed into the developing section again by recycling, non-uniform transfer, voids, and dirtying of the interior of the device due to toner deposition of the background of images and toner, to occur and toner, to worsen over time. In addition, the heat-resistant storability, the developability and the like easily deteriorate.

With an additive whose average primary particle diameter is too large, the fluidity of the toner deteriorates. Thus, sufficient chargeability cannot be obtained, and toner deposition of the background of images and toner scattering easily occurs. Further, the surface of the photosensitive body is easily scratched, and causes filming and the like to easily occur.

The particle diameter of the additive can be determined by measurement by a transmission type electron microscope.

In addition to the aforementioned additives, the toner of the present invention may include other additives. Examples of other additives include, as a lubricant, Teflon, zinc stearate, polyvinylidene fluoride, and the like; and as an abrasive, cerium oxide, silicon carbide, strontium titanate, and the like; and as an electrical conductivity imparting agent, zinc oxide, antimony oxide, tin oxide, and the like.

The method of producing the toner of the present invention is not particularly limited, and the toner can generally be produced as follows.

① The above binder resin, coloring agent, and as needed, charge control agent, mold releasing agent, other additives and the like, are sufficiently mixed together by a mixer such as a Henschel mixer.

② The structural materials are kneaded well by batch-type two-roll mixer, a Banbury mixer, or a continuous-type biaxial extruder such as the KTK biaxial extruder manufactured by Kobe Steel Ltd., the TEM biaxial extruder or the KCK biaxial extruder manufactured by Toshiba Machine Co., Ltd., the PCM biaxial extruder manufactured by Ikegai Tekko Co., the KEX biaxial extruder manufactured by Kurimoto Ltd., or a continuous-type uniaxial kneader such as the co-kneader heat kneader manufactured by Buss Co., Ltd.

③ After the kneaded substance is cooled, the substance is roughly milled by a hammer mill or the like, and then finely milled by a mechanical pulverizer or a fine pulverizer using a jet air stream. The milled substance is classified to a predetermined particle size by using a classifier using a whirling stream of air or a classifier using the Coanda effect, such that mother particles are obtained.

Another method of preparation such as a polymerization method, a capsule method, or the like may be used. Overviews of these preparation methods are as follows.

(Polymerization Method Toner)

① A polymerizable monomer, a coloring agent, and if needed, a selected polymerization initiator, and the like are pelletized in an aqueous dispersion medium.

② The pelletized monomer composition particles are classified to an appropriate particle diameter.

③ The monomer composition particles, whose particle diameter falls within a prescribed range and which have been obtained by the aforementioned classification, are polymerized.

④ After the dispersing agent is removed by an appropriate processing, the polymerized product obtained as described above is filtered, rinsed, and dried, so as to obtain the mother particles.

(Capsule Toner)

① Resin, coloring agent and the like are kneaded in a kneader or the like, and a toner core material in a molten state is obtained.

② The toner core material is placed in water and strongly stirred, such that the cores in the form of fine particles are produced.

③ The core fine particles are placed in a shell material solution, and while stirring is carried out, a poor solvent is added dropwise thereto, such that capsules are formed by the shell material covering the surface of the cores.

④ After the capsules obtained as described above are filtered, they are dried so as to obtain mother particles.

The mother particles and additives, such as inorganic oxides or the like, are sufficiently mixed together by a mixer such as a Henschel mixer (manufactured by Mitsui Miike Machinery Co., Ltd.), a mechanofusion system (manufactured by Hosokawa Micron Corporation), a mechanomill (manufactured by Okada Seiko Co., Ltd.), or the like. If needed, the mixture is passed through a sieve having a mesh of about 150 $\mu$m or less to remove aggregates, large particles, and the like.

Here, it is preferable that the peripheral speed of the distal ends of the stirring blades at the time of mixing together the mother particles and the additives be 15 to 35 m/sec.

If the peripheral speed of the distal ends of the stirring blades is less than 15 m/sec, sufficient mixing cannot be carried out. Thus, the additives are not mixed uniformly, the additives which are freed adhere to the image carrier such as the photosensitive body, or to the developing roller and the carrier and the like, tend to cause impediments to developing, such as filming and the like, to occur. Further, a deterioration in developability and a dirtying of background portions due to poor charging of the toner easily occurs.

Conversely, if the peripheral speed of the distal ends of the stirring blades is greater than 35 m/sec, the additives strongly adhere to the mother particles and easily sink into the surfaces of the mother particles. Thus, cohesion occurs easily, and sufficient fluidity cannot be obtained. Moreover, due to the generation of heat at the time of mixing, there is the possibility that the toner will fuse. In particular, in the case of a color toner, this trend becomes more marked because a binder resin, which softens in low temperature and which contains a large amount of low molecular weight components, is generally used.

In particular, when using an image forming device which recycles, at the developing section, toner which has been recovered from the image carrier such as the photosensitive drum, the intermediate transfer body, the transfer belt or the like, because the fluidity deteriorates, the conveyability at the time of moving to the developing section deteriorates. Further, during movement to the cleaning section and the developing section, mechanical external forces such as rubbing, stirring and the like are received, and thus, cohering tends to occur. As a result, when these toners are mixed in again into the developing section by recycling, non-uniform transfer, voids, and dirtying of the interior of the device due to toner deposition of the background of images tends to occur and toner to worsen over time. In addition, the heat-resistant storability and the developability easily deteriorate.

The particle diameter of the toner of the present invention is preferably, as the weight average diameter, 2.5 to 10 $\mu$m, and particularly preferably 4 to 8 $\mu$m.

By making the toner contain a coloring agent formed from a metal material which has high hardness and a high specific gravity, in the milling process during manufacturing of the toner, due to the difference in the hardnesses of the coloring agent and the binder resin, the region at which stress concentrates is formed at the interface of the binder resin and the coloring agent. Milling is easy, and the process can handle making the toner into small diameter particles.

Due to the structure of the present invention, even with a toner of a small particle diameter, good effects with respect to toner deposition of the background of images, toner scattering, filming, and the like can be obtained.

In a case in which the particle diameter is less than 2.5 $\mu$m, even if the structure of the present invention is used, toner deposition of the background of images and scattering of the toner may occur at the time of development, and the fluidity may deteriorate and the replenishing of toner and cleanability may be impeded. Moreover, in the case of a large particle diameter of greater than 10 $\mu$m, problems may arise such as dust in the image, a deterioration of the resolution, or the like.

Here, the particle size distribution of the toner can be measured by any of various methods, but in the present example, measurement was carried out by using a Coulter Multisizer. Namely, by using the Coulter-Multisizer IIe (manufactured by Beckman-Coulter Co.) as the measuring device, an interface (manufactured by Nikkaki KK) and a personal computer, which output the number distribution and the volume distribution, are connected, and the electrolytic solution is adjusted to a 1% NaCl aqueous solution by using first class sodium chloride.

As the method of measurement, 0.1 to 5 ml of a surfactant, preferably alkylbenzene sulfonic acid salt, was added as a dispersing agent into 100 to 150 ml of the aforementioned electrolytic aqueous solution. Further, 2 to 20 mg of a measurement sample was added, and dispersion processing was carried out for about 1 to 3 minutes by an ultrasonic disperser. 100 to 200 ml of an electrolytic aqueous solution was placed in another beaker, and the aforementioned sample dispersed solution was added such that the density became a predetermined density. The average of the particle diameters of 50,000 particles was measured by using a 100 $\mu$m aperture as the aperture by the Coulter Multisizer IIe.

The toner of the present invention contains in a binder resin at least a coloring agent formed from a metal material, and satisfies the relationships that the saturation magnetization is 0.01 to 10 emu/g and the true specific gravity is 1.33 to 1.62 g/cm$^3$. In this way, toner deposition of the background of images, toner scattering and the like do not occur, the fluidity is excellent, there is little filming or the like, and stable image quality can be obtained over a long period of time. The effects are particularly marked when continuously printing a large number of images having large image surface areas. Moreover, excellent effects can be obtained even with small particle diameter toners which tend to worsen toner dispersability, dirtying of background portions, and toner scattering.

The toner for developing latent electrostatic images of the present invention can be used as is as a single-component electrostatic charge image developer. On the other hand, as a double-component electrostatic charge image developer, the toner can be used to form a double-component electrostatic charge image developer together with a carrier.

(Double-component Electrostatic Charge Image Developer)

The double-component electrostatic charge image developer of the present invention includes the toner of the present invention and a carrier. A conventionally known carrier can be used as the carrier. Examples include powders which are magnetic, such as iron powder, ferrite powder, or nickel powder, and glass beads and the like. In particular, it is preferable that the surface thereof be covered by a resin or the like.

In this case, examples of the resin which is used are polycarbon fluoride, polyvinyl chloride, polyvinylidene chloride, phenol resins, polyvinyl acetal, styrene-acrylic resin, silicone resins, and the like.

The styrene-acrylic resin preferably has a styrene as a monomer unit of 30 to 90% by weight. If the styrene monomer unit is less than 30% by weight, the developability deteriorates. If the styrene monomer unit is greater than 90% by weight, the coating film hardens and is easily peeled off, and the life of the carrier is shortened.

As the resin which is used, in addition to the aforementioned resins, adhesion imparting agents, hardeners, lubricants, conductive materials, charge control agents, and the like can be contained.

As the method of forming the resin layer, in the same way as conventionally, resin can be applied onto the surface of the carrier by a means such as a spraying method, an immersing method, or the like.

The amount of the resin which is used is preferably usually 1 to 10 parts by weight with respect to 100 parts by weight of the carrier.

The film thickness of the resin is preferably 0.02 to 2 $\mu$m, particularly preferably 0.05 to 1 $\mu$m, and even more preferably 0.1 to 0.6 $\mu$m. If the film thickness is thick, the fluidity of the carrier and the electrostatic charge image developer tend to deteriorate. If the film thickness is thin, it is easy over time for the resin to receive effects such as scraping off of the film and the like.

The saturation magnetization of the above carrier is preferably 20 to 100 emu/g, and particularly preferably 30 to 80 emu/g.

If the saturation magnetization of the carrier is too low, it is difficult for the electrostatic charge image developer to be held well on the developing sleeve. Adhesion of the carrier and toner scattering tend to occur, and the magnetic brush becomes small, or the density of the magnetic brush becomes sparse. Thus, the effect of cleaning the surface of the photosensitive body is insufficient, and easily causes filming.

On the other hand, if the saturation magnetization of the carrier is too high, the magnetic brush, which is formed by the toner and the carrier on the developing sleeve which opposes the electrostatic latent image on the photosensitive body at the time of development, is set in a tightly compact state. The gradation and the reproduction of halftones deteriorates, and the chargeability of the toner deteriorate as well.

By setting the saturation magnetization of the carrier within the range of 20 to 100 emu/g, the bristles of the magnetic brush become an appropriate density and an appropriate hardness. Thus, a polishing effect of a certain extent is imparted to the electrostatic charge image developer layer itself, and the photosensitive body is polished minutely. The filming, such as toner or adsorbed water or the like, on the photosensitive body can thereby be cleaned.

A carrier whose saturation magnetization is 20 to 100 emu/g has a relatively high magnetization. Thus, the frictional electrification amount donating effect with respect to the toner is great, and the effect of improving toner deposition of the background of images is extremely good. Further, a toner using this carrier has excellent image uniformity and gradation reproducibility.

The residual magnetization of the carrier is preferably 20 emu/g or less, and particularly preferably 10 emu/g or less, and even more preferably 0 emu/g in practice.

If the residual magnetization of the carrier is too high, the cohesion of the carrier itself after passing through a magnetic field is high, and the mixability with the toner deteriorates. The carrier adheres strongly to a developing sleeve provided with a fixed magnet, and the conveyability of the electrostatic charge image developer greatly deteriorates. Thus, non-uniformities in the image or the like arises easily.

In measuring the magnetic characteristics of the carrier, the saturation magnetization and the residual magnetization were determined from a history curve at the time when a magnetic field was swept to 3 kOe on a carrier, which was filled in a cell having an inner diameter of 7 mm$\phi$ and a height of 10 mm, by using a magnetization measuring device BHU-60 manufactured by Riken Denshi KK.

The specific resistivity of the carrier is preferably $10^7$ to $10^{14}$ $\Omega\cdot$cm.

If the specific resistivity of the carrier is too low, the bristles of the electrostatic charge image developer layer likely become sparse, charge injection easily occurs, and easily causes deterioration in image quality, such as non-uniformities of the image, to be brought about. Further, if the specific resistivity of the carrier is too high, the ability of the frictional electrification to rise deteriorates markedly, and thus, non-uniformities in the image easily occurs. Moreover, it is difficult to apply a bias potential to the distal end portion of the electrostatic charge image developer layer.

The measurement of the specific resistivity of the carrier was carried out as follows. The carrier was placed in a container having a sectional surface area of about 10 cm$^2$ and a thickness of about 2 mm, and tapping was carried out. Thereafter, a load of 1 kg/cm$^2$ was applied to the filled carrier. The specific resistivity was determined by measuring the electric current value when voltage of 100 V was applied between the load and the bottom surface electrode.

The weight average diameter of the carrier is preferably 30 to 65 $\mu$m.

If the weight average diameter of the carrier is too small, the carrier easily adheres to the photosensitive body, and causes the photosensitive body, the cleaning blade, the charging roller, and the like to be scratched.

Further, if the weight average diameter is too large, when used in combination with a small diameter toner in particular, the ability of the carrier to hold the toner deteriorates, and easily causes non-uniform image density of solid images, toner scattering, and dirtying of background portions to occur. Further, the magnetic brush becomes sparse, and it is difficult to obtain a high quality image.

Here, the weight average diameter of the carrier was measured by a laser refraction type particle size distribution meter (manufactured by Horiba, Ltd.).

As described above, examples of bad effects that arise when the carrier is made to have a small particle diameter are a deterioration of the fluidity as an electrostatic charge image developer, and a deterioration of the conveyability of the electrostatic charge image developer in the developing device. Changes in the conditions of the device, such as increasing the stirring strength within the developing device, and the like, have been proposed as countermeasures to these problems. However, problems such as the durable lifespan of the electrostatic charge image developer and the developing device becoming shorter arise, which is not preferable. Thus, it is important to ensure a certain level of fluidity for the electrostatic charge image developer.

The flow rate of the double-component electrostatic charge image developer is preferably 20 to 55 seconds.

If the flow rate exceeds 55 seconds, the fluidity is poor, donating of charges to the replenished toner cannot be carried out smoothly, and the image deteriorates. Further, if the flow rate is less than 20 seconds, conveying of the electrostatic charge image developer utilizing the frictional resistance of the electrostatic charge image developer does not proceed well, and problems arise with respect to the conveyability of the electrostatic charge image developer.

Here, the flow rate of the electrostatic charge image developer was measured by using a bulk specific gravity measuring device having an orifice diameter of 3.00 m$\phi$. 50.0 g of the electrostatic charge image developer was placed in from the entrance of the bulk specific gravity meter, with the lower exit being covered. Simultaneously with the releasing of the lower exit, a stop watch was turned on, and the time required for the electrostatic charge image developer to completely exit from the lower exit of the entrance was measured.

The initial toner density of the double-component electrostatic charge image developer is preferably 0.5 to 7.0%, and particularly preferably 2.5 to 6.0%.

If the toner density is less than 0.5%, when the electrostatic charge image developer is stirred in the developing device, the load applied to the toner is great. In using the electrostatic charge image developer for a long period of time, filming on the photosensitive body and the like and carrier spent and the like occur. The durability of the electrostatic charge image developer deteriorates, and the image quality easily deteriorates as well. Moreover, the toner density exceeding 7.0% easily leads to toner deposition of the background of images and scattering of toner in particular at the time when the toner is replenished.

(Container Containing Toner)

The container containing toner of the present invention is the toner of the present invention which is filled into a toner container. In a case in which the toner of the present invention is used, the toner is filled into a toner container. The toner container, into which the toner is filled, is distributed separately from the image forming device. The user generally loads the container containing toner into the image forming device to provide image formation.

The container containing toner is not limited, and is not limited to a conventional bottle type or cartridge type container.

The image forming device into which the container containing toner is loaded is not limited, as long as it is a device for forming images by an electrophotographic method. Examples include copiers, printers, facsimile devices, and the like.

Figure 2:
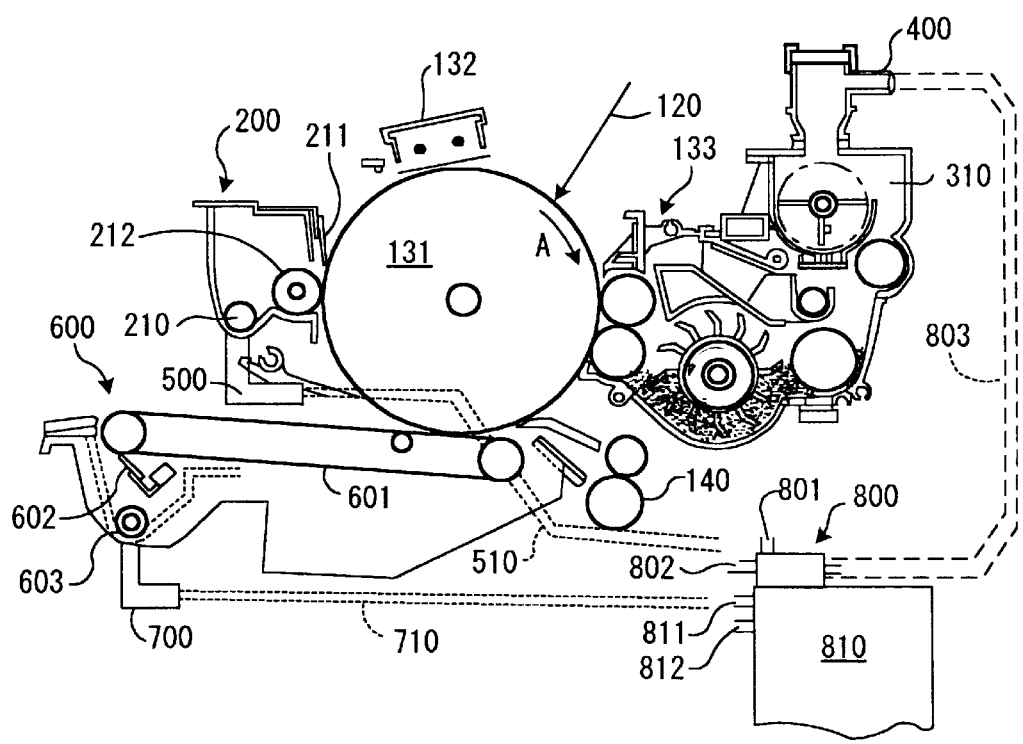
FIG. 2 is a schematic structural view illustrating an example of main portions of the image forming device and method relating to the present invention.
Figure 3:
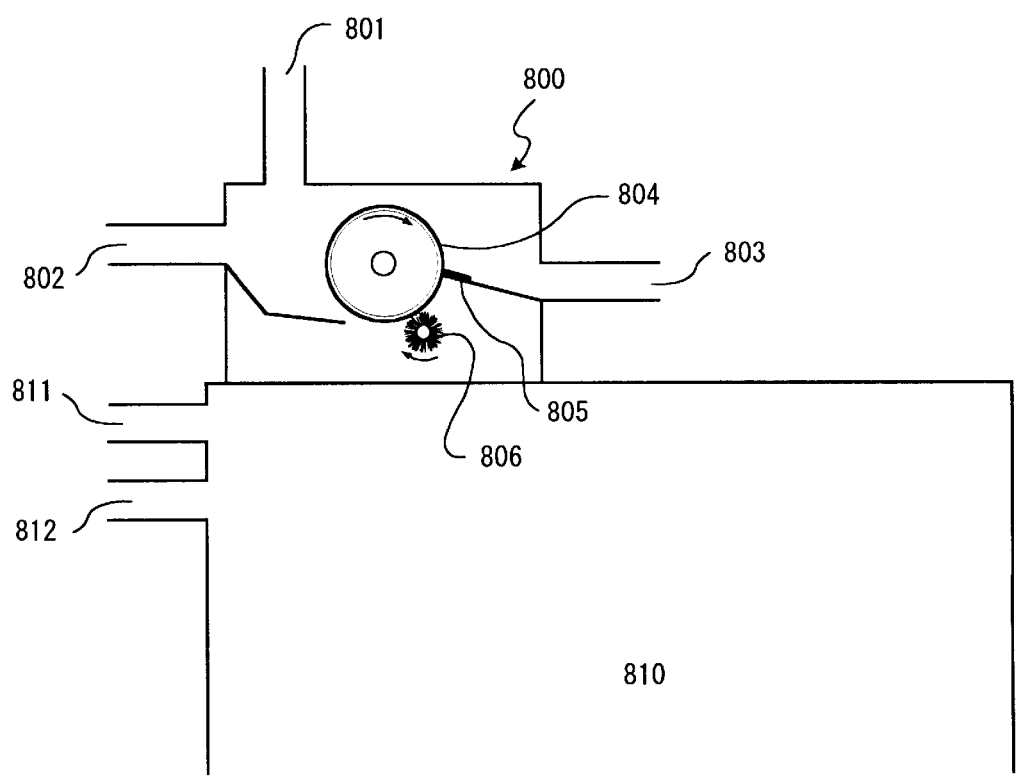
FIG. 3 is a cross-sectional view illustrating an example of a toner recycling mechanism in which a magnetic field generating means is provided at a recycling section of the image forming device and method relating to the present invention.
Figure 4:
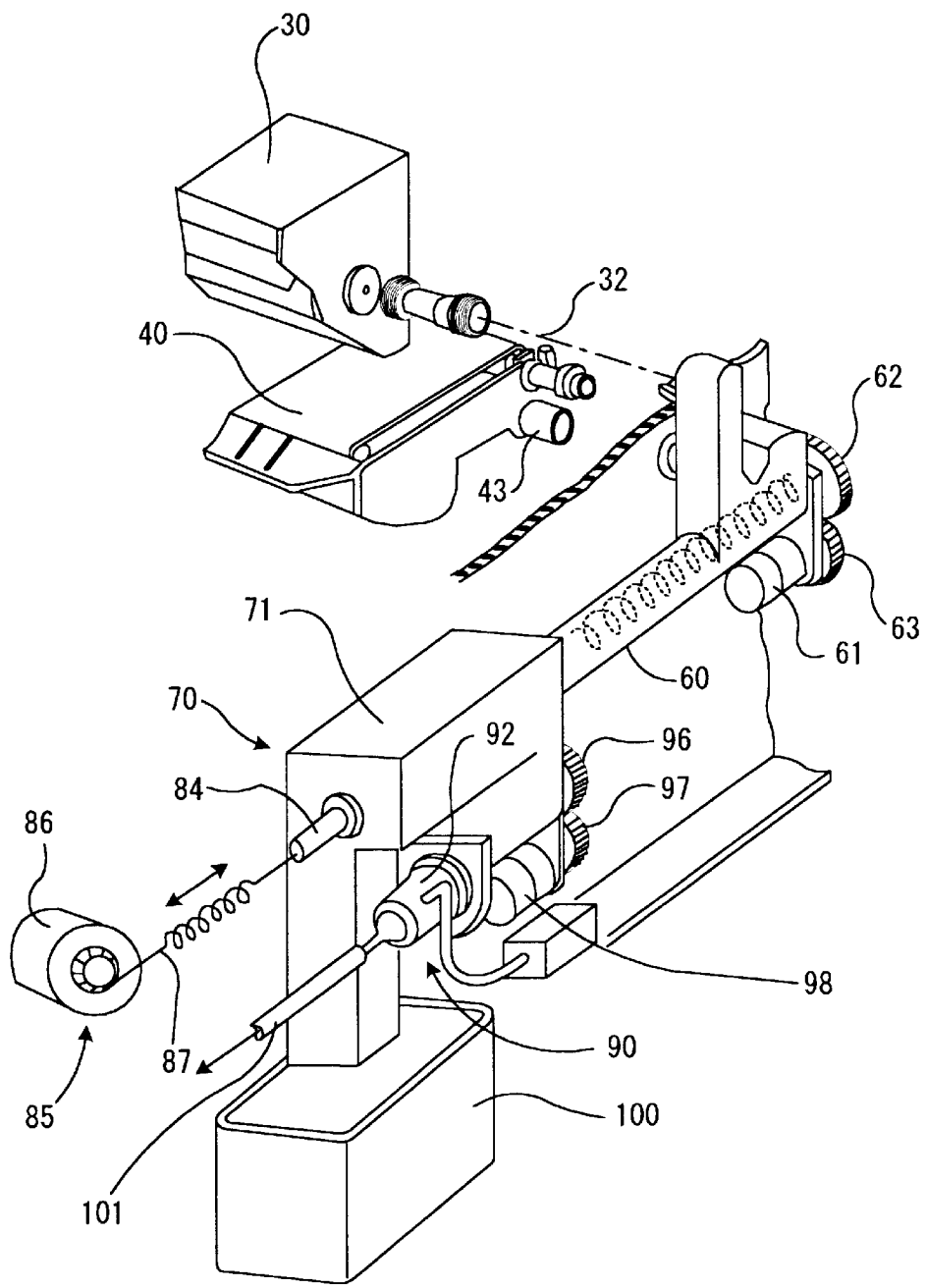
FIG. 4 is a perspective view illustrating an example of a toner recycling mechanism in which a classifying means is provided at a recycling section of the image forming device and method relating to the present invention.
Figure 5:
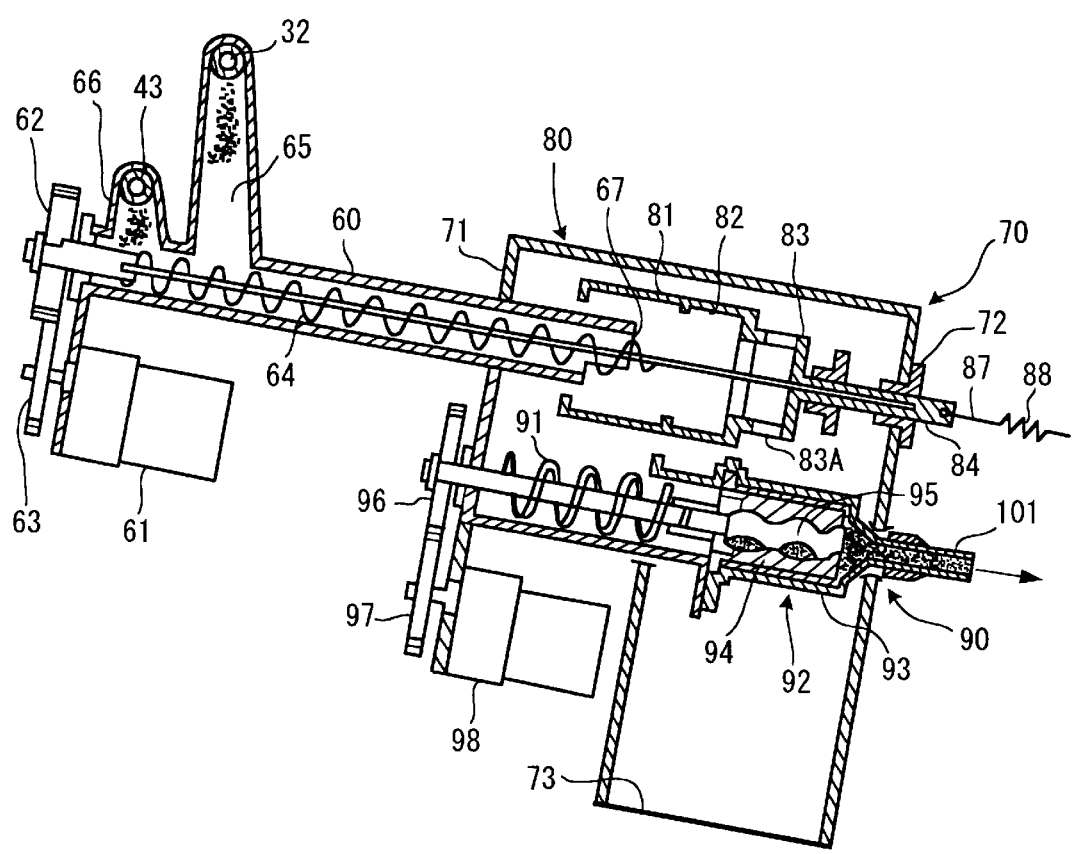
FIG. 5 is a perspective view illustrating an example of a toner recycling mechanism in which a classifying means is provided at a recycling section of the image forming device and method relating to the present invention.

Next, embodiments will be described in which the developing method of the present invention is applied to an image forming method using a double-component electrostatic charge image developer. Here, FIG. 1 is a schematic structural view illustrating an example of the image forming device and method relating to the present invention. FIG. 2 is a schematic structural view illustrating an example of main portions of the image forming device and method. FIG. 3 is a cross-sectional view showing an example of a toner recycling mechanism in which a magnetic field generating means is provided at a recycling section of the image forming device and method. FIGS. 4 and 5 are a perspective view and a cross-sectional view showing an example of a toner recycling mechanism in which a classifying means is provided at the recycling section of the image forming device and method.

A copy device main body 100 of FIG. 1 is equipped with a reading optical system 101, a writing optical system 102, an image forming section 103, a paper feed section 104, and the like. This copier 100 is provided with the image forming section 103 which is in accordance with a known electrophotographic method. The image forming section 103 is provided with a drum-like photosensitive body 131. A charging device 132, an exposure means 120, a developing device 133, a transfer/conveying device 600, and a cleaning device 200, for implementing electrophotographic copy processes, are disposed successively at the periphery of the photosensitive body 131 along the rotating direction shown by arrow A. The reading optical system 101 has a light source 122 which irradiates light onto an original placed on a document loading stand 121 on the top surface of the copier main body, a first mirror 123 and second and third mirrors 124, 125 which guide in predetermined directions the light reflected by the original, and a pick-up means 126 such as a CCD or the like which receives and photoelectrically converts the light which has been reflected by the original and which has been led through a lens and the like (not shown). An image processing section (not shown), which receives digital image data which has been outputted from the pick-up means 126 and A/D converted, carries out requisite processings on the image data. On the basis of the image signal after these image processings, the writing optical system 102 operates such that a latent electrostatic image is formed on the photosensitive body 131. The electrostatic latent image which is formed on the photosensitive body 131 is toner-imaged by the developing device 133. This toner image is electrostatically transferred by the transfer/conveying device 600 onto a transfer sheet which is fed from a paper feed device 140. The transfer sheet which carries the toner image is conveyed to a fixing device 135 and subjected to fixing, and is then discharged to the exterior of the copier, e.g., on to a discharge tray 150. Note that, although a digital-type image forming device is shown as an example in FIG. 1, the embodiments of the present invention which will be described hereinafter are also applicable to analog-type image forming devices.

Next, at the main portions of the image forming device shown in FIG. 2, the toner, which has been caused to adhere onto the photosensitive body 131 by the developing device 133, is, as a rule, electrostatically transferred onto transfer paper at the transfer/conveying device 600. However, a portion of the toner remains untransferred and remains on the photosensitive body. This untransferred toner is scraped off from the photosensitive body 131 by a cleaning blade 211 or a brush roller 212 of the cleaning device 200. The scraped-off toner is fed into a toner recycling unit 500 from a discharge opening 210 of the cleaning device 200.

A transfer belt 601 of the transfer/conveying device 600 also contacts the untransferred portions and the non-image portions of the photosensitive body, and toner adheres onto the belt 601. Such toner dirties the reverse side of the transfer sheet, and thus, a blade 602 scrapes this toner off.

The scraped-off toner is sent into a toner recycling unit 700 from a discharge opening 603. The toner recycling unit 700 has the same structure as that of the toner recycling unit 500 which is provided at the cleaning device 200.

Then, a toner flow riding on air reaches a recycle/disposal switching section 800 via elastic tubes 510, 710 which will be described later. In a case in which the recovered toners of the cleaning device 200 and the transfer/conveying device 600 are to be recycled, the elastic tube 510 is inserted into a nozzle 802. In a case in which both toners are to be disposed of, the elastic tube 510 is inserted into a nozzle 811 and the elastic tube 710 is inserted into a nozzle 812. In a case in which the recovered toner from the cleaning device is to be recycled and the recovered toner from the transfer/conveying device is to be disposed of, the elastic tube 510 is inserted into a nozzle 801, and the elastic tube 710 is inserted into the nozzle 812. Nozzle openings which are not connected to tubes are capped so that leaking of toner is prevented. The toner flow, which is heading toward recycling by the nozzles 801, 802 enters into a toner replenishing hopper 310 from an injection opening 400 of the developing device 133 via a tube 803, is mixed together with new toner from a new toner bottle (not illustrated), and becomes replenishing toner. On the other hand, the toner flow which is flowing through the tube connected to the disposal nozzles 811, 812 enters into a disposal bottle 810, and is accumulated therein. As needed, the toner is thrown out from the bottle, or thrown out together with the bottle.

As the method of cleaning the transfer residual toner on the latent image carrier, any of blade cleaning, web cleaning, fur brush cleaning, magnetic brush cleaning, cleaning methods combining these, or the like are preferable. However, blade cleaning by an elastic blade is even more preferably used.

Examples of developing methods in which recovered toner is supplied to the developing device are a method of supplying the recovered toner directly to the developing device, and a method of temporarily supplying the recovered toner into a container which holds toner for replenishing, and thereafter, supplying the recovered toner together with the toner for replenishing to the developing device. In the present invention, either of these methods can be preferably used.

Further, in the image forming device and method of the present invention, by, in particular, providing a toner sorting mechanism by a magnetic field generating means at the recycling section, it is possible to prevent re-mixing-in into the developing section of fibers of the transfer paper which have become mixed in with the recovered toner, fillers such as talc, kaolin, calcium carbonate, and the like, suspended matter in the air, and toner whose characteristics have deteriorated, such as toner having low magnetism (e.g., fine powder toner), toner having low coloring ability in which the coloring agent is not sufficiently dispersed, and the like. In this way, it is possible to greatly suppress a deterioration in image density over time, an increase in the scattering of dirt and toner, generation of filming, and the like. In addition, it is possible to prevent the generation of carrier spent due to fine powder toner, the generation of image defects such as uneven transfer and voids, and the like.

Next, an example of a toner recycling mechanism, in which a magnetic field generating means is provided at a recycling section, will be described on the basis of the cross-sectional view of FIG. 3.

Within the recycle/disposal switching section 800 of FIGS. 2 and 3, a sleeve 804, in which a magnet is built-in, is provided. By a driving means (not illustrated), the sleeve 804 is driven to rotate in the direction of the arrow. Further, as needed, a bias voltage may be applied to the sleeve, and the bias voltage which is applied at this time may be alternating current or direct current. Here, when bias voltage is applied, a level of about 500 to 3000 V is suitable. When the bias voltage which is applied is lower than 500 V, it is difficult for the effects of applying the bias voltage to appear. On the other hand, if the bias voltage exceeds 3000 V, leaks easily occurs, which is not preferable.

Further, in a case in which bias voltage is applied, it is preferable to apply the bias voltage such that there is an inverse polarity of the polarity of the toner.

Reference numeral 805 is a scraping blade which is for scraping the toner, which has been carried and conveyed by the sleeve 804, off from the surface of the sleeve 804. The toner which is scraped off by the scraping blade 805 is discharged through the tube 803 to the exterior of the recycle/disposal switching section 800. The toner enters into the toner replenishing hopper form the injection opening 400 of the developing device 133, and is mixed in with new toner from a new toner bottle (not shown) so as to become replenishing toner.

Reference numeral 806 is a brush for brushing off to the disposal bottle 810, adhered matter such as toner which remains on the sleeve, fibers and fillers of the paper, and the like. The brush 806 is driven to rotate at a low speed in the direction opposite to the sleeve.

Next, the flow of the toner in the toner recycling mechanism will be described. The toner which is recovered from the cleaning device 200 and the transfer/conveying device 600 is conveyed within the toner recycling mechanism shown in FIG. 2 by the nozzles 801 and 802, and is supplied to the sleeve 804. Here, the recovered toner adheres to the surface of the sleeve 804 due to the magnetism of magnets within the sleeve 804 and due to the applied bias voltage. As the sleeve rotates 804, the toner is conveyed to the scraping blade 805, is scraped off from the surface of the sleeve 804 by the scraping blade 805, and is transferred to the developing device 133 via the tube 803.

On the other hand, toner, which is weakly magnetic, and adhered matter, such as fibers or fillers or the like of the transfer paper or the like, does not adhere to the sleeve 804, and drops downward and is recovered in the disposal bottle 810 as disposal toner.

The adhered matter, such as toner or the like which remains adhered to the sleeve 804 without being scraped off by the scraping blade 805, is brushed off by the brush, falls downward, and is similarly recovered in the disposal bottle 810 as disposal toner.

Further, in the image forming device and method of the present invention, by, in particular, providing a toner sorting mechanism by a classifying means at the recycling section, it is possible to prevent re-mixing-in into the developing section of fibers of the transfer paper which have become mixed in with the recovered toner, fillers such as talc, kaolin, calcium carbonate, and the like, suspended matter in the air, and toner whose characteristics have deteriorated, such as cohered toner or the like. In this way, it is possible to greatly suppress a deterioration in image density over time, an increase in toner deposition of the background of images and scattering of toner, generation of filming, and the like. In addition, it is possible to suppress the generation of image defects such as uneven transfer and voids, and the like.

Next, an example of a toner recycling mechanism in which a classifying means is provided at a recycling section will be described on the basis of the perspective view and the cross-sectional view of FIG. 4 and FIG. 5.

In FIGS. 4 and 5, discharge openings 32 and 43, from which toner recovered from the cleaning device 200 and the transfer/conveying device 600 is discharged, are provided at the rear side of the device main body. The discharge openings 32 and 43 are connected via paths 65, 66 to a pipe 60 which is connected to a recovered toner processing device 70.

The conveying of recovered toner to the toner processing device 70 is carried out by a conveying screw 64, which is housed in the pipe 60, receiving driving force from a motor 61 via gears 62, 63, and rotating. The pipe 60 is fit together with a case 71 of the recovered toner processing device 70. A toner classifying device 80, which serves as a classifying means, and a toner transfer device 90, which transfers recovered toner to the developing device 133, are provided within the case 71.

The toner classifying device 80 has a hollow-cylindrical classifying net 81. The classifying net 81 is, via a hollow cylindrical member 82 of the same diameter, fixed and held at a holder 83 in which a discharge opening 83A is formed. The holder 83 receives rotational driving from the conveying screw 64 so as to rotate, and the classifying net 81 is thereby also rotated. Further, a guide shaft 84, which extends to the exterior of the case 71, is provided integrally with the holder 83. The guide shaft 84 is rotatable via a bearing 72 at the case 71, and is supported so as to be movable in a thrusting direction. A classifying net moving means 85 (FIG. 4) is freely rotatably connected to the distal end of the guide shaft 84 at the exterior of the case 71. The classifying net moving means 85 has a wire 87 which is taken-up or rewound by a moving motor 86 (FIG. 4). A spring 88 is disposed along the course of the wire 87.

A toner transfer device 90 is disposed beneath the toner classifying device 80. A conveying screw 91 and a screw pump 92 which is connected to the conveying screw 91 are disposed within the case 71. The screw pump 92 is formed by a female screw shaped stator 94, which forms a spiral groove of a double pitch and which is formed by an elastic body such as rubber or the like which is fit into a holder 93 which is mounted to the case 71, and a male screw shaped rotor 95, which is fit into the stator 94 so as to be freely rotatable. The rotor 95 is joined integrally with one end of the shaft of the conveying screw 91 by a screw or a pin or the like. The other end of the conveying screw 91 passes through the case 71, and at the exterior of the case 71, receives the driving of a driving motor 98 via gears 96, 97. Further, an opening 73 is formed in the lower portion of the right side of the case. The opening 73 communicates with a disposal bottle (not shown).

The flow of the recovered toner at this time is such that the recovered toner which passes through the pipe 60 falls down into the classifying net 81 from a toner discharge portion 67. Here, the toner which passes through the classifying net 81 falls onto the conveying screw 91, and is transferred to the developing device 133 by the screw pump 92 which is connected to the conveying screw 91. At this time, if air is supplied from an air pump 102 shown in FIG. 4 to the toner discharge side of the screw pump 92, fluidization of the toner is promoted by this air, and transfer by the screw pump 92 is reliable. Further, if the screw pump 92 is used, a flexible tube-like member formed from, for example, soft vinyl chloride, silicone, nylon, Teflon (trade name) or the like, can be used for a hose 101 which is connected to this discharge side. Thus, the transfer path is free, and toner can be transferred freely in any arbitrary vertical or left/right direction. Moreover, because the transfer of toner by the screw pump 92 does not apply mechanical stress to the toner, such transfer is extremely effective in transferring toner to be recycled.

Adhered matter, such as cohered toner or fibers or fillers of the transfer paper or the like which cannot pass through the classifying net 81, drop down from the discharge opening 83A of the holder 83, and are recovered in a disposal bottle (not shown) from the opening 73 as disposal toner.

In particular, at this time, the true specific gravity of the toner is 1.33 to 1.62 g/cm³, which is large as compared with a regular toner. Thus, not only is it possible to improve the precision of classifying adhered matter such as fibers and fillers of the transfer paper and the like which have a low specific gravity, but also, it is possible to sort out the cohered toner which is contained in the recovered toner. In this way, it is possible to suppress the generation of image defects such as uneven transfer, voids and the like which are due to the mixing in of cohered toner and the like.

Figure 6:
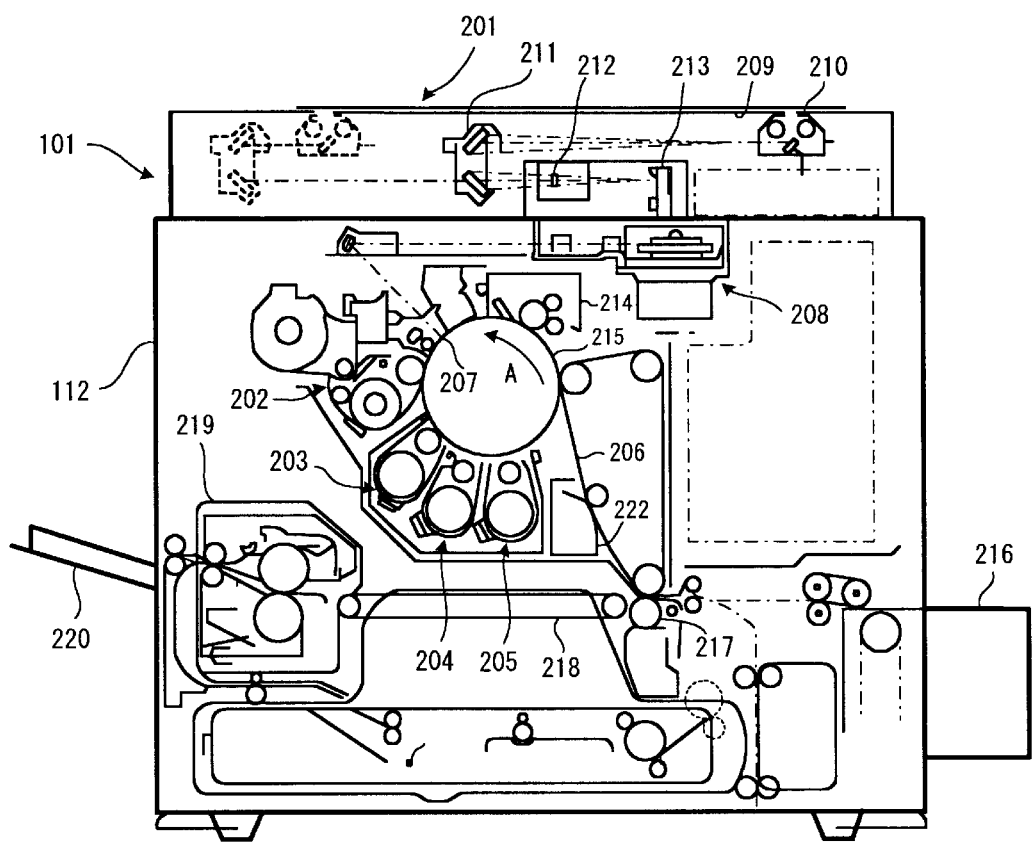
FIG. 6 is a schematic structural view illustrating an example of an image forming device and method in which a developing method of the present invention is applied to a color image forming method.

Next, an embodiment will be described in which the developing method of the present invention is applied to a color image forming method. First, by using FIG. 6 which is a schematic structural view of a copier, the structure and the operation of the copier relating to the present embodiment will be described. A copier 201 in the present embodiment is basically formed from a scanner 101, which serves as an image reading means, and a printer 112, which serves as an image output means. The scanner 101 is for optically reading an original image, and is formed from a contact glass 209 serving as an original placement stand, an exposure lamp 210, a reflecting mirror 211, an image-forming lens 212, a CCD image sensor 213, and the like. A halogen lamp is generally used as the exposure lamp 210. Reading of an original image by the scanner 101 is carried out as follows.

Light is illuminated by the exposure lamp 201 onto the original which is set on the contact glass 209. The light reflected from the original is guided to the image-forming lens 212 by the reflecting mirror 211 and the like. The image-forming lens 212 images the reflected light onto the CCD image sensor 213. The CCD image sensor 213 converts the reflected light into a digital electrical signal which corresponds to the original image. The CCD image sensor 213 is a full color image sensor, and separates the light signal applied thereto into respective colors of, for example, R (red), G (green) and B (blue), and outputs a digital electrical signal corresponding to each color. Further, the CCD image sensor 213 is disposed in a row in a direction orthogonal to the surface of the drawing of FIG. 6. (This direction is also called the main scanning direction.) The digital electrical signals which are the output of the CCD image sensor 213 are subjected to image processings such as color conversion processing and the like at an image processing section which will be described later, and become cyan (hereinafter, C), magenta (hereinafter, M), yellow (hereinafter, Y), and black (hereinafter, BK) color image data. On the basis of these color image data, at the printer 112 which will be described later, visible images are formed by the C, M, Y, BK toners. By superposing the obtained toner images, a full color image is formed.

A photosensitive body 215, which serves as an image carrier, is disposed at a substantially central portion of the printer 112. The photosensitive body 215 is an organic photosensitive body (OPC) drum, and the outer diameter thereof is around 120 mm. At the periphery of the photosensitive body are disposed a charging device 207 which uniformly charges the surface of the photosensitive body, a BK developing unit 202, a C developing unit 203, an M developing unit 204, a Y developing unit 205, an intermediate transfer belt 206, a cleaning device 214, and the like. A laser optical system 208, which generates a laser beam on the basis of the color image data and scans the light onto the uniformly-charged surface of the photosensitive body 215, is provided above the photosensitive body and beneath the scanner 101. The laser optical system 208 is formed from a laser diode which generates the light beam, a polygon mirror which deflects the light beam, and the like.

The image forming operations at the printer 112 which are carried out in accordance with the above-described structure are as follows. In the following description, a case based on BK image data is described as an example. The latent image, which is formed on the surface of the photosensitive body 215 by a light beam based on the BK image data from the laser optical system 208, is developed by the BK developing unit 202 corresponding thereto, and becomes a BK toner image. This toner image is transferred onto the intermediate transfer belt 206 which is carried on a bias roller 221. Hereinafter, the transfer of the toner image from the photosensitive body 215 onto the intermediate transfer belt 206 will be called belt transfer. The above-described series of operations of formation, development and belt transfer of the latent image are carried out for the four colors of C, M, Y, BK, such that a toner image in which the four colors are superposed is formed on the intermediate transfer belt 206. The toner image in which four colors are superposed is transferred all at once by a transfer bias roller 217 onto a recording medium, e.g., a recording sheet, which is fed in from a paper feed unit 216. The recording medium, on which is formed the image in which the four colors are superposed, is conveyed to a fixing device 219 by a conveying belt 218. The fixing device 219 fuses, by applying heat and applying pressure, the image in which the four colors are superposed, such that the image is fixed onto the recording medium. The recording medium for which fixing has been completed is discharged onto a discharge sheet tray 220. On the other hand, the toner which remains on the surface of the photosensitive body 215 is recovered by the cleaning device 214, and cleaning of the surface of the photosensitive body 215 is carried out. Charges are removed by a charge removing device from the surface of the photosensitive body 215 which has been cleaned. Further, after the image in which the four colors are superposed is transferred from the intermediate transfer belt 206 onto the recording medium, the toner which remains on the intermediate transfer belt 206 is recovered by a belt cleaning device 222, and cleaning of the surface of the intermediate transfer belt 206 is carried out.

Figure 7:
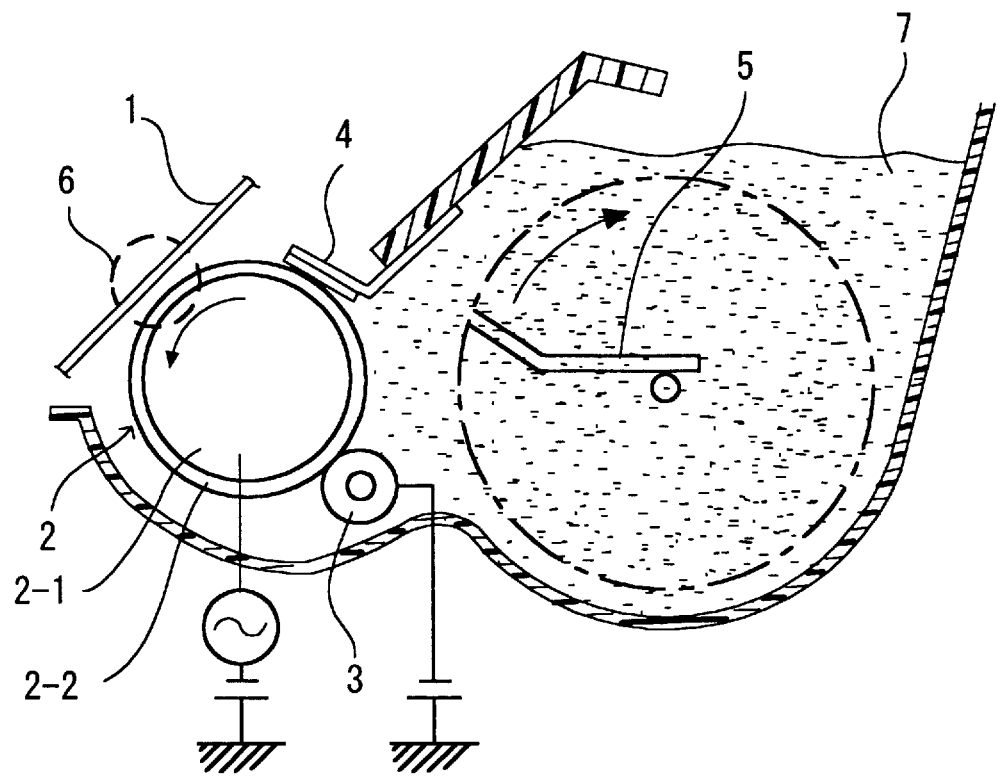
FIG. 7 is a schematic structural view illustrating an example of main portions of an image forming device and method in which the developing method of the present invention is applied to an image forming method using a single-component electrostatic charge image developer.

Next, an embodiment will be described in which the developing method of the present invention is applied to an image forming method using a single-component electrostatic charge image developer. Here, FIG. 7 is a schematic structural view illustrating an example of the main portions of the image forming device and method relating to the present invention. Toner 7 is supplied to the developing device shown in FIG. 7. In FIG. 7, reference numeral 1 is a latent image carrier (photosensitive body), 2 is a developing roller, 2-1 is a core, 2—2 is a resin coat layer, 3 is a toner supplying member, 4 is an electrostatic charge image developer applying blade, 5 is an agitator, and 6 is a developing region. Specifically, the developing roller 2 is a structure in which a surface layer, whose main component is silicone resin, is provided as the resin coat layer on the core 2-1. The toner supplying roller 3, which is formed from a polyurethane material and which abuts the developing roller 2, and the blade 4, which is formed from a urethane material and which abuts the developing roller 2, are set as shown in FIG. 7. FIG. 7 shows that the developing roller 2 has the core 2-1 and the resin coat layer 2—2. However, the developing device may be such that, instead of the core 2-1 and the resin coat layer 2—2, the entire developing roller is formed from a metal material. Note that although a magnetic is housed within the developing roller, the present invention is not limited to the same.

EXAMPLE A

Hereinafter, the toner for a monochrome double-component electrostatic charge image developer of the present invention will be described concretely by Examples. However, the present invention is not limited to these Examples. Further, "parts" in the Examples express parts by weight.

COLORING AGENT PREPARATION EXAMPLE 1

Aniline Black, in an amount of 8% by weight, was fixed to the particle surfaces of Mn-containing maghemite particles A (saturated magnetization when 10 kOe is applied: 15.0 emu/g, average particle diameter: 0.28 g m) by using a mechanomill (manufactured by Okada Seikou Co., Ltd.) or a mechanofusion system (manufactured by Hosokawa Micron Corporation), so as to prepare a surface treated metal material A of Preparation Example 1.

COLORING AGENT PREPARATION EXAMPLE 2

Aniline Black, in an amount of 8% by weight, was fixed to the particle surfaces of Ti-containing hematite particles A (saturated magnetization when 10 kOe is applied: 14.3 emu/g, average particle diameter: 0.25 $\mu$m) by using a mechanomill (manufactured by Okada Seikou Co., Ltd.) or a mechanofusion system (manufactured by Hosokawa Micron Corporation), so as to prepare a surface treated metal material B of Preparation Example 2.

COLORING AGENT PREPARATION EXAMPLE 3

Aniline Black, in an amount of 8% by weight, was fixed to the particle surfaces of Mn-containing hematite particles A (saturated magnetization when 10 kOe is applied: 2.6 emu/g, average particle diameter: 0.03 $\mu$m) by using a mechanomill (manufactured by Okada Seikou Co., Ltd.) or a mechanofusion system (manufactured by Hosokawa Micron Corporation), so as to prepare a surface treated metal material C of Preparation Example 3.

COLORING AGENT PREPARATION EXAMPLE 4

Aniline Black, in an amount of 8% by weight, was fixed to the particle surfaces of magnetite particles A (saturated magnetization when 10 kOe is applied: 76.1 emu/g, average particle diameter: 0.28 $\mu$m) by using a mechanomill (manufactured by Okada Seikou Co., Ltd.) or a mechanofusion system (manufactured by Hosokawa Micron Corporation), so as to prepare a surface treated metal material D of Preparation Example 4.

EXAMPLE A-1

| binder resin | |
|---|---|
| polyester resin | 85 parts |
| (a polyester resin synthesized from terephthalic acid, n-dodecyl succinic anhydride, polyoxypropylene-(2,2)-2, 2-bis (4-hydroxyphenyl) propane, polyoxyethylene-(2,1)-2, 2-bis (4-hydroxyphenyl) propane, and trimellitic acid, Tg: 63° C.) | |
| styrene-acrylic resin | 15 parts |
| (copolymer of styrene and n-butylmethacrylate, Tg: 61° C.) | |
| coloring agent | 20 parts |
| Mn-containing maghemite particles A (saturated magnetization when 10 kOe is applied: 15.0 emu/g, average particle diameter: 0.28 $\mu$m) | |
| charge controlling agent | 2 parts |
| azo-based iron complex | |
| mold releasing agent | 5 parts |
| free fatty acid removed type carnauba wax (melting point: 83° C.) | |

After the above materials were mixed together in a Henschel mixer, the mixture was melted and kneaded by a biaxial kneader which was heated to 140° C. The kneaded mixture was cooled by water, and thereafter, was roughly milled by a cutter mill. After being milled in a fine milling device using a jet air stream, mother particles were obtained by using an air classification device.

| the above mother particles | 100 parts |
|---|---|
| additives | |
| silica (a hexamethyldisilazane surface treated product, average primary particle diameter: 0.012 $\mu$m) | 0.9 parts |
| titania (an isobutyltrimethoxysilane surface treated product, average primary particle diameter: 0.015 $\mu$m) | 0.6 parts |

The above materials were mixed together in a Henschel mixer for 300 seconds with the peripheral speed of the distal ends of the mixing blades being set to 20 m/sec. Thereafter, the mixture was subjected to air elutriation by a sieve having a mesh of 100 $\mu$m, and the toner of Example A-1 was obtained.

EXAMPLE A-2

The toner of Example A-2 was obtained in the same way as in Example A-1, except that the coloring agent of Example A-1 was replaced to Ti-containing hematite particles A (saturated magnetization when 10 kOe is applied: 14.3 emu/g, average particle diameter: 0.25 $\mu$m).

EXAMPLE A-3

The toner of Example A-3 was obtained in the same way as in Example A-1, except that the coloring agent of Example A-1 was replaced to Mn-containing hematite particles A (saturated magnetization when 10 kOe is applied: 2.6 emu/g, average particle diameter: 0.03 $\mu$m).

EXAMPLE A-4

The toner of Example A-4 was obtained in the same way as in Example A-1, except that the coloring agent of Example A-1 was replaced to the surface treated metal material A of Coloring Agent Preparation Example 1.

EXAMPLE A-5

The toner of Example A-5 was obtained in the same way as in Example A-4, except that 3 parts of carbon black (#44: manufactured by Mitsubishi Chemical Corp.) was further added to the coloring agent used in Example A-4.

EXAMPLE A-6

The toner of Example A-6 was obtained in the same way as in Example A-1, except that the coloring agent of Example A-1 was replaced to 30 parts of the surface treated metal material B of Coloring Agent Preparation Example 2.

EXAMPLE A-7

The toner of Example A-7 was obtained in the same way as in Example A-1, except that the coloring agent of Example A-1 was replaced to 15 parts of the surface treated metal material C of Coloring Agent Preparation Example 3.

EXAMPLE A-8

The toner of Example A-8 was obtained in the same way as in Example A-7, except that the amount of the surface treated metal material C of Example A-7 was replaced to 40 parts.

EXAMPLE A-9

The toner of Example A-9 was obtained in the same way as in Example A-1, except that the coloring agent of Example A-1 was replaced to 30 parts of Mn-containing hematite particles B (saturated magnetization when 10 kOe is applied: 0.9 emu/g, average particle diameter: 0.02 $\mu$m).

EXAMPLE A-10

The toner of Example A-10 was obtained in the same way as in Example A-1, except that the coloring agent of Example A-1 was replaced to Ti-containing hematite particles B (saturated magnetization when 10 kOe is applied: 8.2 emu/g, average particle diameter: 0.9 $\mu$m).

EXAMPLE A-11

The toner of Example A-11 was obtained in the same way as in Example A-1, except that the amount of the polyester resin in Example A-1 was replaced to 50 parts, and the amount of the styrene-acrylic resin was changed to 50 parts.

EXAMPLE A-12

The toner of Example A-12 was obtained in the same way as in Example A-1, except that the mold releasing agent of Example A-1 was not used.

EXAMPLE A-13

The toner of Example A-13 was obtained in the same way as in Example A-1, except that the mold releasing agent of Example A-1 was replaced to low molecular weight polypropylene wax (VISCOL 550P: manufactured by Sanyo Chemical Industries, Ltd.).

EXAMPLE A-14

The toner of Example A-14 was obtained in the same way as in Example A-1, except that, in the preparation of Example A-1, (1) the milling feed amount of the milling process was raised and (2) the milling air pressure was lowered.

COMPARATIVE EXAMPLE A-1

The toner of Comparative Example A-1 was obtained in the same way as in Example A-1, except that the coloring agent of Example A-1 was replaced to 10 parts of carbon black (#44: manufactured by Mitsubishi Chemical Corp.).

COMPARATIVE EXAMPLE A-2

The toner of Comparative Example A-2 was obtained in the same way as in Example A-1, except that the coloring agent of Example A-1 was replaced to 10 parts of magnetite particles A (saturated magnetization when 10 kOe is applied: 76.1 emu/g, average particle diameter: 0.28 $\mu$m).

COMPARATIVE EXAMPLE A-3

The toner of Comparative Example A-3 was obtained in the same way as in Comparative Example A-2, except that the amount of the magnetite particles A of Comparative Example A-2 was changed to 20 parts.

COMPARATIVE EXAMPLE A-4

The toner of Comparative Example A-4 was obtained in the same way as in Example A-1, except that the coloring agent of Example A-1 was replaced to the surface treated metal material D of Coloring Agent Production Example 4.

COMPARATIVE EXAMPLE A-5

The toner of Comparative Example A-5 was obtained in the same way as in Comparative Example A-2, except that the amount of the magnetite particles A of Comparative Example A-2 was replaced to 35 parts.

COMPARATIVE EXAMPLE A-6

The toner of Comparative Example A-6 was obtained in the same way as in Example A-9, except that the amount of the Mn-containing hematite particles B of Example A-9 was replaced to 70 parts.

COMPARATIVE EXAMPLE A-7

The toner of Comparative Example A-7 was obtained in the same way as in Comparative Example A-2, except that the amount of the magnetite particles A of Comparative Example A-2 was changed to 110 parts.

The saturation magnetization, true specific gravity, dielectric dissipation factor, and weight average diameter of the toners of Examples A-1 through A-15 and Comparative Examples A-1 through A-7 were measured. The results at this time are shown in Table 1 below.

TABLE 1

| toner | saturation magnetization (emu/g) | true specific gravity (g/cm$^3$) | dielectric dissipation factor ($\times 10^{-3}$) | weight average diameter ($\mu$m) |
|---|---|---|---|---|
| Ex. A-1 | 2.43 | 1.42 | 4.7 | 6.5 |
| Ex. A-2 | 2.34 | 1.42 | 4.4 | 6.7 |
| Ex. A-3 | 0.55 | 1.43 | 4.5 | 6.6 |
| Ex. A-4 | 2.45 | 1.43 | 4.9 | 6.7 |
| Ex. A-5 | 2.40 | 1.40 | 5.8 | 6.5 |
| Ex. A-6 | 5.14 | 1.47 | 6.9 | 6.9 |
| Ex. A-7 | 0.42 | 1.37 | 3.9 | 6.6 |
| Ex. A-8 | 0.81 | 1.57 | 7.2 | 6.3 |
| Ex. A-9 | 0.35 | 1.46 | 9.1 | 6.5 |
| Ex. A-10 | 1.35 | 1.43 | 8.1 | 6.7 |
| Ex. A-11 | 2.45 | 1.42 | 4.9 | 6.9 |
| Ex. A-12 | 2.44 | 1.41 | 4.5 | 6.5 |
| Ex. A-13 | 2.42 | 1.43 | 5.2 | 6.6 |
| Ex. A-14 | 2.44 | 1.42 | 6.1 | 11.3 |
| Comp. Ex. A-1 | 0.00 | 1.28 | 5.8 | 6.6 |
| Comp. Ex. A-2 | 6.87 | 1.31 | 6.2 | 6.4 |

TABLE 1-continued

| toner | saturation magnetization (emu/g) | true specific gravity (g/cm³) | dielectric dissipation factor (× 10⁻³) | weight average diameter (μm) |
|---|---|---|---|---|
| Comp. Ex. A-3 | 11.90 | 1.41 | 5.8 | 6.8 |
| Comp. Ex. A-4 | 11.70 | 1.41 | 5.9 | 6.7 |
| Comp. Ex. A-5 | 22.17 | 1.51 | 7.1 | 6.6 |
| Comp. Ex. A-6 | 1.68 | 1.73 | 13.5 | 6.9 |
| Comp. Ex. A-7 | 44.51 | 1.85 | 9.4 | 6.7 |

CARRIER PREPARATION EXAMPLE

Core Material

| Cu-Zn ferrite particles (weight average diameter: 45 μm) | 5000 parts |
|---|---|

Coating Material

| toluene | 450 parts |
|---|---|
| silicone resin SR2400 (manufactured by Dow Corning Toray Silicone Co., Ltd., nonvolatile portion: 50%) | 10 parts |
| carbon black | 10 parts |

The above coating material was dispersed for 10 minutes in a stirrer to prepare a coating liquid. The coating liquid and the core material were placed in a coating device which was provided with a rotary-type bottom plate disk and stirring blades within a flowing bottom, and which carried out coating while forming a swirling flow. The coating liquid was thereby applied to the core material.

The obtained carrier was calcinated for 2 hours at 250° C. in an electric furnace, and carrier particles (saturated magnetization when 3 kOe is applied: 65 emu/g, residual magnetization when 3 kOe is applied: 0 emu/g, specific resistivity: $3.2 \times 10^8$ Ω·cm, average particle diameter: 45 μm) having a film thickness of 0.5 μm were obtained.

ELECTROSTATIC CHARGE IMAGE DEVELOPER PREPARATION EXAMPLE 2.5 parts of the toners of Examples A-1 through A-12 and Comparative Examples A-1 through A-7, and 97.5 parts of the carrier of the above preparation example were mixed together in a tabular mixer, and electrostatic charge image developers having flow rates of 29 to 37 seconds were obtained.

EVALUATION OF EXAMPLES AND COMPARATIVE EXAMPLES

Each of the aforementioned electrostatic charge image developers were set at a copier having the image forming main portions shown in FIG. 2 and the image forming device shown in FIG. 1. In an environment of ordinary temperature and ordinary humidity, 100,000 copies were continuously made. The following various evaluations were carried out thereon, and ranking in 5 levels was carried out in accordance with the following criteria. The results at this time are shown in Table 2 below.

Further, in Example A-15, the toner and the electrostatic charge image developer of Example A-1 were set at a copier which had the image forming main portions shown in FIG. 2, and had a toner recycling mechanism having a magnetic field generating means at the recycling section as shown in FIG. 3, and had the image forming device shown in FIG. 1. In the same way, in an environment of ordinary temperature and ordinary humidity, 100,000 copies were continuously made. Similarly, the following various evaluations were carried out thereon, and ranking in 5 levels was carried out in accordance with the following criteria. The results at this time are shown in Table 2 below.

Further, in Example A-16, the toner and the electrostatic charge image developer of Example A-1 were set at a copier which had the image forming main portions shown in FIG. 2, and had a toner recycling mechanism having a classifying means at the recycling section as shown in FIGS. 4 and 5, and had the image forming device shown in FIG. 1. In the same way, in an environment of ordinary temperature and ordinary humidity, 100,000 copies were continuously made. Similarly, the following various evaluations were carried out thereon, and ranking in 5 levels was carried out in accordance with the following criteria. The results at this time are shown in Table 2 below.

Criteria

⊚: extremely good level

○: good level

□: ordinary level

Δ: level which did not present problems in practice

X: level which presented problems in practice (Durability)

The evaluation of durability was carried out as follows. After 100,000 copies were continuously made, the image density of a solid portion was measured by X-Rite 938, and the difference between the image density of the same place on the initial image was evaluated.

Here, the lower the image density as compared to the initial image density, the worse the durability.

(Toner Deposition of the Background of Images)

The evaluation of toner deposition of the background of images was carried out by visually evaluating the extent of generation of dirtying at the non-image portions after 100,000 copies were continuously made.

(Toner Scattering)

The evaluation of toner scattering was carried out by visually evaluating the extent of toner scattering within the copier after 100,000 copies were continuously made.

(Filming)

The evaluation of filming was carried out by visually evaluating the extent of filming of the photosensitive body after 100,000 copies were continuously made.

(Non-Uniform Transfer/Voids)

The evaluation of non-uniform transfer/voids was carried out as follows. After 100,000 sheets were continuously outputted, 10 sheets were continuously outputted in which the entire surface of an A3 size paper was printed with a solid image. The degree of non-uniform transfer/voids was evaluated visually.

TABLE 2

| | durability | toner deposition of the background of images | | toner scattering | | filming | non-uniform transfer/voids | | comments |
|---|---|---|---|---|---|---|---|---|---|
| | | initial | after 100,000 copies | initial | after 100,000 copies | after 100,000 copies | initial | after 100,000 copies | |
| Ex. A-1 | ◎ | ◎ | ○ | ◎ | ○ | ◎ | ◎ | ○ | |
| Ex. A-2 | ◎ | ◎ | ○ | ◎ | ○ | ◎ | ◎ | ○ | |
| Ex. A-3 | ◎ | ◎ | ○ | ◎ | ○ | ◎ | ◎ | ○ | |
| Ex. A-4 | ◎ | ◎ | ◎ | ◎ | ○ | ◎ | ◎ | ○ | |
| Ex. A-5 | ◎ | ◎ | ○ | ◎ | ○ | ○ | ◎ | ○ | |
| Ex. A-6 | ○ | ◎ | ○ | ◎ | ○ | ◎ | ◎ | ○ | |
| Ex. A-7 | ○ | ○ | ○ | ○ | ○ | ◎ | ◎ | ○ | |
| Ex. A-8 | ○ | ◎ | ◎ | ◎ | ○ | ◎ | ◎ | ○ | |
| Ex. A-9 | ◎ | ○ | ○ | ○ | ○ | ◎ | ◎ | ○ | |
| Ex. A-10 | ◎ | ○ | ○ | ○ | □ | ◎ | ◎ | ○ | |
| Ex. A-11 | ◎ | ◎ | ○ | ◎ | ○ | ◎ | ◎ | □ | |
| Ex. A-12 | ◎ | ◎ | ○ | ◎ | ◎ | ◎ | ○ | ○ | |
| Ex. A-13 | ○ | ◎ | ○ | ◎ | ○ | ○ | ◎ | ○ | |
| Ex. A-14 | ◎ | ◎ | ○ | ◎ | ○ | ○ | ○ | ○ | |
| Ex. A-15 | ◎ | ◎ | ◎ | ◎ | ◎ | ◎ | ◎ | ◎ | |
| Ex. A-16 | ◎ | ◎ | ◎ | ◎ | ◎ | ◎ | ◎ | ◎ | |
| Comp. Ex. A-1 | ○ | ○ | □ | ○ | □ | □ | ◎ | □ | |
| Comp. Ex. A-2 | △ | ○ | □ | ○ | △ | □ | □ | △ | image density low, consumed amount of toner large |
| Comp. Ex. A-3 | □ | ○ | ○ | ○ | □ | ○ | ○ | □ | |
| Comp. Ex. A-4 | □ | ○ | ○ | ○ | ○ | ○ | ○ | □ | |
| Comp. Ex. A-5 | △ | ○ | □ | ○ | □ | ○ | ○ | □ | |
| Comp. Ex. A-6 | □ | ○ | □ | ○ | □ | ○ | ○ | □ | |
| Comp. Ex. A-7 | □ | ○ | △ | ○ | △ | ○ | ○ | □ | |

In Comparative Example A-2, a sufficient image density could not be obtained, and the amount of toner which was consumed was clearly greater than the other Examples and Comparative Examples. Thus, problems in practice were confirmed.

EXAMPLE B

Hereinafter, the toner for a color double-component electrostatic charge image developer of the present invention will be described concretely by Examples. However, the present invention is not limited to these Examples. Further, "parts" in the Examples express parts by weight.

EXAMPLE B-1

A black toner was obtained from the following formulation amounts.

| | |
|---|---|
| binder resin: polyester resin | 100 parts |
| coloring agent: blackmetalmaterialA (a manganese-containing hematite black metal material, saturated magnetization when 10 kOe is applied: 5.1 emu/g, true specific gravity: 4.5 g/cm$^3$, primary particle diameter: 0.03 μm) | 10 parts |
| charge controlling agent: BONTRON E84 (manufactured by Orient Chemical Co., Ltd.) | 3 parts |

In the method of preparing the toner, the respective components were preliminarily mixed together in a mixer. Thereafter, the mixture was melted and kneaded by being passed three times through a three-roll mill, and thereafter, after being cooled, was roughly milled to a particle diameter of about 1 to 2.5 mm. Next, the particles were finely milled by an air jet method, and were classified and the toner was obtained. R972 (a silica manufactured by Nippon Aerosil Co., Ltd., having an average primary particle diameter of 0.016 μm) was externally added to the toner as a fluidity imparting agent in a ratio of 0.5 parts with respect to 100 parts of each toner, and a black toner was obtained.

EXAMPLE B-2

A toner was prepared in the same way as in Example B-1, except that the coloring agent was replaced to 30 parts of black metal material B (a titanium-containing hematite black metal material, saturated magnetization when 10 kOe is applied: 32.6 emu/g, true specific gravity: 4.2 g/cm$^3$ primary particle diameter: 0.25 μm).

EXAMPLE B-3

A toner was prepared in the same way as in Example B-1, except that the formulated amount of the black metal material A was changed to 15 parts.

EXAMPLE B-4

A toner was prepared in the same way as in Example B-1, except that the coloring agent was replaced to 30 parts of black metal material C (a manganese-containing hematite black metal material, saturated magnetization when 10 kOe is applied: 1.7 emu/g, true specific gravity: 4.5 g/cm$^3$, primary particle diameter: 0.02 μm).

EXAMPLE B-5

A toner was prepared in the same way as in Example B-1, except that the amount of feed at the time of milling was increased, the milling air pressure was reduced, and the particle diameter was increased.

EXAMPLE B-6

A toner was prepared in the same way as in Example B-1, except that 10 parts of carbon black #44 (manufactured by Mitsubishi Chemical Corp.) was added as the coloring agent.

COMPARATIVE EXAMPLE B-1

A toner was prepared in the same way as in Example B-1, except that the coloring agent was replaced to 35 parts of black metal material D (a magnetite black metal material, saturated magnetization when 10 koe is applied: 81.1 emu/g, true specific gravity: 4.5 g/cm$^3$, primary particle diameter: 0.28 μm).

COMPARATIVE EXAMPLE B-2

A toner was prepared in the same way as in Example B-1, except that the coloring agent was replaced to 70 parts of black metal material E (a manganese-containing hematite black metal material, saturated magnetization when 10 kOe is applied: 1.7 emu/g, true specific gravity: 4.5 g/cm$^3$, primary particle diameter: 0.02 μm).

COMPARATIVE EXAMPLE B-3

A toner was prepared in the same way as in Example B-1, except that the coloring agent was replaced to 10 parts of carbon black #44 (manufactured by Mitsubishi Chemical Corp.).

The saturation magnetization, true specific gravity, dielectric dissipation factor, and weight average diameter of the toners of the Preparation Examples were respectively measured. The results at this time are shown in Table 3.

TABLE 3

| toner | saturation magnetization (emu/g) | true specific gravity (g/cm$^3$) | dielectric dissipation factor (× 10$^{-3}$) | weight average diameter (μm) |
|---|---|---|---|---|
| Ex. B-1 | 0.80 | 1.42 | 4.6 | 6.7 |
| Ex. B-2 | 6.91 | 1.46 | 6.8 | 6.8 |
| Ex. B-3 | 0.66 | 1.33 | 3.8 | 6.5 |
| Ex. B-4 | 0.38 | 1.45 | 9.1 | 6.4 |
| Ex. B-5 | 0.81 | 1.43 | 4.8 | 8.6 |
| Ex. B-6 | 0.89 | 1.42 | 5.0 | 6.8 |
| Comp. Ex. B-1 | 20.1 | 1.51 | 7.2 | 6.5 |
| Comp. Ex. B-2 | 0.71 | 1.73 | 7.3 | 6.8 |
| Comp. Ex. B-3 | 0.00 | 1.28 | 5.8 | 6.7 |

ELECTROSTATIC CHARGE IMAGE DEVELOPER PRODUCTION EXAMPLE

As the carrier particles, a coating liquid was prepared in accordance with the following formulation as a carrier coating material.

| | |
|---|---|
| silicone resin liquid (SR2406 manufactured by Toray Silicone Industries, Inc., amount of solids: 20%) | 200 parts |
| toluene | 1500 parts |

5000 parts of ferrite particles having an average particle diameter of 50 μm was placed in a rotary disc type fluid layer particle coating device. While the particles were made to flow, the coating liquid of the above formulation was dispersed therein under application of heat of 80° C. The resultant coated matter for which coating was carried out was removed from the coating device and placed in a thermostatic oven. Heating was carried out for two hours at 200° C. such that hardening of the silicone layer was carried out. A carrier having an average diameter of 50 μm and a volume specific resistivity of 3.2×10$^{12}$ Ω·cm was obtained.

For each toner, mixing was carried out such that the total amount of the carrier and the toner was 100 parts with respect to 5 parts of the toner, and a dry-type double-component electrostatic charge image developer was prepared.

<Implementation of Image Forming Method, and Evaluation of Toner and Electrostatic Charge Image Developer>

For each of the above-described Examples and Comparative Examples, by using the toner thereof, an electrostatic charge image developer was prepared in accordance with the above method by using the toner. The electrostatic charge image developer was set at a full color copier (PRETER 550, manufactured by Ricoh Co., Ltd.). Under environmental conditions of ordinary temperature and ordinary humidity, 50,000 copies were continuously made. The following various types of evaluations were carried out, and ranking in five levels was carried out in accordance with the following criteria.

⊚: extremely good level

○: good level

□: ordinary level

Δ: level which did not present problems in practice

X: level which presented problems in practice (Durability)

The amounts of charge of the electrostatic charge image developer initially and after 50,000 copies were continuously made were measured. The durability was evaluated by the extent of the decrease in the amount of charge of the electrostatic charge image developer after 50,000 copies were continuously made, as compared with the initial amount.

Here, the more the amount of charge decreases as compared to the initial amount, the worse the durability.

(Toner Deposition of the Background of Images)

The evaluation of toner deposition of the background of images was carried out by visually evaluating the extent of generation of dirtying at the non-image portions (initially and) after 50,000 copies were continuously made.

(Toner Scattering)

The evaluation of toner scattering was carried out by visually evaluating the extent of toner scattering within the copier (initially and) after 50,000 copies were continuously made.

(Filming)

The evaluation of filming was carried out by visually evaluating the extent of filming of the photosensitive body after 50,000 copies were continuously made. The results at this time are shown in Table 4.

TABLE 4

| toner | image density initial | image density after 50,000 copies | dirtying of the background portions initial | dirtying of the background portions after 50,000 copies | toner scattering initial | toner scattering after 50,000 copies | filming after 50,000 copies |
|---|---|---|---|---|---|---|---|
| Ex. B-1 | ⊚ | ⊚ | ⊚ | ○ | ⊚ | ○ | ⊚ |
| Ex. B-2 | ⊚ | ○ | ⊚ | ○ | ⊚ | ○ | ⊚ |
| Ex. B-3 | ○ | ○ | ○ | ○ | ⊚ | ○ | ⊚ |
| Ex. B-4 | ⊚ | ⊚ | ○ | ○ | ○ | ○ | ⊚ |
| Ex. B-5 | ⊚ | ⊚ | ⊚ | ○ | ⊚ | ○ | ⊚ |
| Ex. B-6 | ⊚ | ⊚ | ⊚ | ○ | ⊚ | ○ | ⊚ |
| Comp. Ex. B-1 | ○ | □ | ○ | ○ | ⊚ | ○ | ○ |
| Comp. Ex. B-2 | ○ | □ | Δ | X | Δ | X | ⊚ |
| Comp. Ex. B-3 | ⊚ | ○ | ○ | □ | ○ | □ | □ |

EXAMPLE C

Hereinafter, the toner for a single-component electrostatic charge image developer of the present invention will be described concretely by the following Examples. However, the present invention is not limited to these Examples. The results of evaluation of the characteristics of the respective Examples are shown in Table 5. For the evaluating device, a modified version of the Myricopy M-5 manufactured by Ricoh Co., Ltd. and shown in FIG. 7 was used. Further, "parts" herein refers to parts by weight. The evaluations of the respective characteristic show results obtained by carrying out, on the basis of the following evaluations, averaging of the results of evaluation of each Example at the time of starting and after 100,000 copies were made. Moreover, for only Example C-4, evaluation was carried out with the fixing section modified to an oil applying type because the toner of Example C-4 does not include a mold releasing agent.

The methods of evaluating the characteristics of the toners prepared in the respective Examples are described hereinafter.

1) Image Density

A solid image of 1 mg/cm$^2$ was prepared, the image density at that time was measured by using a Macbeth densitometer, and the image density was evaluated in accordance with the following five levels. Note that the image density of a black toner using an ordinarily commercially available carbon black was evaluated to be a level of □.
(⊚: very high; ○: high; □: regular; Δ: low; X: very low)

2) Toner Deposition of the Background of Images

A3 size sheets were output by using a white original. The image density at six arbitrary positions on the image was measured by using a Macbeth reflection densitometer. The image density was evaluated in five levels in accordance with the following criteria for judgment. A state in which there was no toner deposition of the background of images at all is a value that is equivalent to the reflection density of the paper. The larger the value, the worse the toner deposition of the background of images.
(⊚: very good; ○: good; □: regular; Δ: poor; X: very poor)

3) Toner Scattering

The state of scattering of the toner within the copier was evaluated in accordance with the following five levels. Note that black toner using a regular carbon black was evaluated to be a level of □.
(⊚: very good; ○: good; □: regular; Δ: poor; X: very poor)

4) Thin Line Reproducibility

An image evaluation test was carried out for each electrostatic charge image developer. The thin line reproducibility was evaluated at 5 levels on the basis of the following judgment criteria.
excellent: ⊚; good: ○; regular: □; poor: Δ; worst: X Next, Preparation Examples of surface treated black metal materials used in the present Examples and the like are shown. These materials can be obtained by known surface treating means, but are not limited to being obtained by known surface treating means.

COLORING AGENT PRODUCTION EXAMPLE 1

Carbon black was fixed to the particle surfaces of Mn-containing maghemite particles (saturated magnetization: 12.0 emu/g, average particle diameter: 0.26 μm) by using an 8 wt % mechanomill (manufactured by Okada Seikou Co., Ltd.) or a mechanofusion system (manufactured by Hosokawa Micron Corporation), so as to prepare a surface treated metal material 1.

COLORING AGENT PRODUCTION EXAMPLE 2

Carbon black was fixed to the particle surfaces of magnetite particles (saturated magnetization: 75.1 emu/g, average particle diameter: 0.25 μm) by using an 8 wt % mechanomill (manufactured by Okada Seikou Co., Ltd.) or a mechanofusion system (manufactured by Hosokawa Micron Corporation), so as to prepare a surface treated metal material 2.

COLORING AGENT PRODUCTION EXAMPLE 3

Carbon black was fixed to the particle surfaces of Mn-containing hematite particles (saturated magnetization: 0 emu/g, average particle diameter: 0.25 μm) by using an 8 wt % mechanomill (manufactured by Okada Seikou Co., Ltd.) or a mechanofusion system (manufactured by Hosokawa Micron Corporation), so as to prepare a surface treated metal material 3.

EXAMPLES C-1, C-2

| | |
|---|---|
| polyester resin (monomer: PO/EO additive of bisphenol A, terephthalic acid/trimellitic acid, Tg: 62° C.) | 80 parts by weight |
| polyethylene-styrene / acryl graft copolymer | 20 parts by weight |

-continued

| | |
|---|---|
| (SP Value: 9.0, monomer:polyethylene, styrene, methyl acrylate) free fatty acid removed type carnauba wax (melting point: 83° C., penetration: 0.5) | 5 parts by weight |
| metal salt of salicylic acid derivative | 2 parts by weight |
| carbon black (#44 manufactured by Mitsubishi Carbon Co.) | 3 parts by weight |
| surface treated metal material 1 | 22 parts by weight |

After the above materials were sufficiently mixed together in a blender, the mixture was kneaded by a biaxial extruder. After cooling, the mixture was milled and classified, and a mother toner was obtained. 0.6 wt % of a hydrophobic silica and 0.3 wt % of titanium oxide were added to and mixed in with the obtained mother toner such that the final toner was obtained. Respective evaluations were carried out on the toner.

COMPARATIVE EXAMPLE C-1

A toner was obtained in accordance with a method which was similar to that of Example C-1, except that the surface treated metal compound 1 of Example C-1 was replaced to surface treated compound 2.

COMPARATIVE EXAMPLE C-2

A toner was obtained in accordance with a method which was similar to that of Example C-1, except that the surface treated metal compound 1 of Example C-1 was replaced to surface treated metal compound 3.

COMPARATIVE EXAMPLE C-3

A toner was obtained in accordance with a method which was similar to that of Example C-1, except that 100 parts by weight of the surface treated metal compound 1 of Example C-1 was used.

COMPARATIVE EXAMPLE C-4

A toner was obtained in accordance with a method which was similar to that of Example C-1, except that the surface treated compound 1 of Example C-1 was not used, and 18 parts by weight of carbon black was used.

EXAMPLE C-3

A toner was obtained in accordance with a method which was similar to that of Example C-1, except that the carbon black of Example C-1 was not used, and the amount of the surface treated metal compound 1 was changed to 25 parts by weight.

EXAMPLE C-4

A toner was obtained in accordance with a method which was similar to that of Example C-3, except that the mold releasing agent of Example C-3 was not used.

EXAMPLE 5

A toner was obtained in accordance with a method which was similar to that of Example C-1, except that the carnauba wax of Example C-1 was replaced to low molecular weight polypropylene (VISCOLE 550P, manufactured by Sanyo Chemical Industries, Ltd.)

TABLE 5

| | average particle diameter ($\mu$m) | saturation magnetization (emu/g) | true specific gravity (g/cm$^3$) | image density | dirtying | toner scattering | thin line reproducibility |
|---|---|---|---|---|---|---|---|
| Ex. C-1 | 12.5 | 2.2 | 1.42 | ○ | ○ | ○ | □ |
| Ex. C-2 | 7.0 | 2.2 | 1.42 | ○ | ○ | ○ | ◎ |
| Ex. C-3 | 7.0 | 2.4 | 1.42 | ○ | ○-◎ | ○ | ◎ |
| Ex. C-4 | 7.0 | 2.5 | 1.42 | ○ | ○-◎ | ○ | ◎ |
| Ex. C-5 | 7.0 | 2.2 | 1.42 | ○ | ○ | ○ | ◎ |
| Comp. Ex. C-1 | 7.0 | 11.9 | 1.42 | Δ-□ | ○ | ◎ | ◎ |
| Comp. Ex. C-2 | 7.0 | 0 | 1.42 | ○ | □ | □ | ◎ |
| Comp. Ex. C-3 | 7.0 | 9.1 | 1.77 | Δ | □ | ○ | ◎ |
| Comp. Ex. C-4 | 7.0 | 0 | 1.25 | ○ | □-Δ | □ | ◎ |

The present invention provides a toner for developing latent electrostatic images, an electrostatic charge image developer, a toner in a toner container, an image forming device and an image forming method in which, even in, in particular, continuous output of a large number of images having large image surface areas, toner deposition of the background of images and scattering of toner do not occur, fluidity is excellent, there is little filming and the like, and moreover, even when toners of a small particle diameter are used, stable image quality can be obtained over a long period of time.

What is claimed is:

1. A toner for developing latent electrostatic images comprising:
   a coloring agent comprising a metal material; and
   a binder resin;
   wherein said toner has a saturation magnetization of 0.01 to 10 emu/g, and a true specific gravity of 1.33 to 1.62 g/cm$^3$.

2. The toner for developing latent electrostatic images according to claim 1, wherein said metal material has at least one type of compounds of elements of Fe, Mn, Ti, Cu, Si and C, on a surface of one of hematite and maghemite.

3. The toner for developing latent electrostatic images according to claim 1, wherein said metal material is blackened by a surface treatment using at least one type selected from pigments and dyes.

4. The toner for developing latent electrostatic images according to claim 1, wherein said coloring agent further comprises a carbon black in an amount of 0.01 to 5 weight % with respect to a total weight of said toner.

5. The toner for developing latent electrostatic images according to claim 1, wherein said saturation magnetization of said toner is 0.01 to 4 emu/g.

6. The toner for developing latent electrostatic images according to claim 1, wherein said saturation magnetization of said toner is 0.05 to 4 emu/g.

7. The toner for developing latent electrostatic images according to claim 1, wherein said true specific gravity of said toner is 1.35 to 1.55 g/cm$^3$.

8. The toner for developing latent electrostatic images according to claim 1, wherein said true specific gravity of said toner is 1.40 to 1.55 g/cm$^3$.

9. The toner for developing latent electrostatic images according to claim 1, wherein a dielectric dissipation factor of said toner is $2.5 \times 10^{-3}$ to $7.5 \times 10^{-3}$.

10. The toner for developing latent electrostatic images according to claim 1, wherein an average particle diameter of said metal material is 0.01 to 0.8 μm.

11. The toner for developing latent electrostatic images according to claim 1, wherein a contained amount of said metal material is 10 to 25 parts by weight with respect to 100 parts by weight of said binder resin.

12. The toner for developing latent electrostatic images according to claim 1, wherein at least polyester resin is used as said binder resin.

13. The toner for developing latent electrostatic images according to claim 1, wherein said toner further comprises a mold releasing agent.

14. The toner for developing latent electrostatic images according to claim 13, wherein said mold releasing agent is at least one type selected from free fatty acid removed type carnauba wax, montan wax, and oxidized rice wax.

15. The toner for developing latent electrostatic images according to claim 1, wherein said toner further comprises an additive selected from the group consisting of silica and titania, which additive is externally added to said toner.

16. The toner for developing latent electrostatic images according to claim 1, wherein a weight average diameter of said toner is 2.5 to 10 μm.

17. The toner for developing latent electrostatic images according to claim 1, wherein said toner is a toner for a double-component electrostatic charge image developer, and said true specific gravity of said toner is 1.35 to 1.60 g/cm$^3$.

18. The toner for developing latent electrostatic images according to claim 1, wherein said toner is a toner for a single-component electrostatic charge image developer, and said saturation magnetization of said toner is 0.01 to 3 emu/g.

19. The toner for developing latent electrostatic images according to claim 1, wherein said toner is at least one type selected from yellow toner, magenta toner, cyan toner, and black toner.

20. A container device configured to contain toner, comprising;
   a container; and
   a toner contained in said container, said toner configured to develop latent electrostatic images, containing at least a coloring agent formed from a metal material and a binder resin containing said coloring agent, and having a saturation magnetization of 0.01 to 10 emu/g and a true specific gravity of 1.33 to 1.62 g/cm$^3$.

21. An electrostatic charge image developer comprising at least a toner for developing latent electrostatic images, said toner containing, in a binder resin, at least a coloring agent formed from a metal material, a saturation magnetization of said toner being 0.01 to 10 emu/g, and a true specific gravity of said toner being 1.33 to 1.62 g/cm$^3$.

22. The electrostatic charge image developer according to claim 21, further comprising a carrier.

23. The electrostatic charge image developer according to claim 22, wherein a surface of said carrier is coated by a coating material containing silicone resin.

24. An image forming method comprising:
   a latent electrostatic image forming step of forming a latent electrostatic image on a latent electrostatic image carrier; and
   a developing step of developing said electrostatic latent image by using an electrostatic charge image developer accommodated in a developing device, said electrostatic charge image developer containing at least a toner for developing latent electrostatic images, said toner containing, in a binder resin, at least a coloring agent formed from a metal material, a saturation magnetization of said toner being 0.01 to 10 emu/g, and a true specific gravity of said toner being 1.33 to 1.62 g/cm$^3$.

25. The image forming method according to claim 24, wherein said developing step comprises:
   stirring said electrostatic charge image developer within said developing device so that said toner is frictionally energized.

26. The image forming method according to claim 24, wherein said developing device has a electrostatic charge image developer carrier disposed so as to oppose said electrostatic latent image carrier, and said electrostatic charge image developer carrier has a magnetic field generating means which can generate a magnetic field, and said developing step is carried out by using said electrostatic charge image developer which is carried on said electrostatic charge image developer carrier as an electrostatic charge image developer layer.

27. The image forming method according to claim 24, further comprising a transfer step of electrostatically transferring, onto a transfer material, a developed image which has been developed by said developing step.

28. The image forming method according to claim 27, wherein said transfer step includes a primary transfer step of primarily transferring, onto an intermediate transfer body, said developed image which has been developed by said developing step, and a secondary transfer step of secondarily transferring, onto said transfer material, said developed image which has been transferred onto said intermediate transfer body.

29. The image forming method according to claim 27, further comprising:
   a cleaning step of cleaning electrostatic charge image developer which remains on said electrostatic latent image carrier after said transfer step; and
   a recycling step of returning, to said developing device, said electrostatic charge image developer which has been cleaned by said cleaning step, and recycling said electrostatic charge image developer.

30. The image forming method according to claim 29, wherein said recycling step is carried out by a magnetic field generating means.

31. The image forming method according to claim 29, wherein said recycling step is carried out by a classifying means.

32. An image forming device comprising:
   a latent electrostatic image carrier;
   a latent electrostatic image forming means for forming a latent electrostatic image on said electrostatic latent image carrier; and
   a developing means for accommodating an electrostatic charge image developer containing at least a toner for developing latent electrostatic images, said toner containing, in a binder resin, at least a coloring agent formed from a metal material, a saturation magnetization of said toner being 0.01 to 10 emu/g, and a true specific gravity of said toner being 1.33 to 1.62 g/cm$^3$, and for developing said electrostatic latent image.

33. The image forming device according to claim 32, wherein said developing means comprises:
means for stirring and frictionally electrifying said toner.

34. The image forming device according to claim 32, wherein said developing means is disposed so as to oppose said electrostatic latent image carrier, and has an electrostatic charge image developer carrier which is a rotatable cylinder form and which has a magnetic field generating means and which can generate a magnetic field, and an electrostatic charge image developer layer forming means which makes said electrostatic charge image developer be carried in a layer form on said electrostatic charge image developer carrier.

35. The image forming device according to claim 32, further comprising:
transfer means for electrostatically transferring, onto a transfer material, a developed image which has been developed by said developing means.

36. The image forming device according to claim 35, wherein said transfer means includes a primary transfer means for primarily transferring, onto an intermediate transfer body, said developed image which has been developed by said developing means, and a secondary transfer means for secondarily transferring, onto said transfer material, said developed image which has been transferred onto said intermediate transfer body.

37. The image forming device according to claim 35, further comprising:

a cleaning means for cleaning electrostatic charge image developer which remains on said electrostatic latent image carrier after transfer by said transfer means has been carried out; and a recycling means for returning, to said developing means, said electrostatic charge image developer which has been cleaned by said cleaning means, and recycling said electrostatic charge image developer.

38. The image forming device according to claim 37, wherein said recycling means has a magnetic field generating.

39. The image forming device according to claim 37, wherein said recycling means has a classifying means.

* * * * *